United States Patent
Hwang et al.

(10) Patent No.: US 12,057,014 B2
(45) Date of Patent: Aug. 6, 2024

(54) METHOD BY WHICH RSUS TRANSMIT AND RECEIVE SIGNALS IN WIRELESS COMMUNICATION SYSTEM

(71) Applicant: LG ELECTRONICS INC., Seoul (KR)

(72) Inventors: Jaeho Hwang, Seoul (KR); Hakseong Kim, Seoul (KR); Hanbyul Seo, Seoul (KR); Myoungseob Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 321 days.

(21) Appl. No.: 17/616,016

(22) PCT Filed: Jun. 12, 2020

(86) PCT No.: PCT/KR2020/007680
§ 371 (c)(1),
(2) Date: Dec. 2, 2021

(87) PCT Pub. No.: WO2020/251314
PCT Pub. Date: Dec. 17, 2020

(65) Prior Publication Data
US 2022/0327929 A1 Oct. 13, 2022

(30) Foreign Application Priority Data
Jun. 12, 2019 (KR) ........................ 10-2019-0069583

(51) Int. Cl.
*G08G 1/00* (2006.01)
*G08G 1/0967* (2006.01)
*H04W 4/40* (2018.01)

(52) U.S. Cl.
CPC ........ *G08G 1/096783* (2013.01); *H04W 4/40* (2018.02)

(58) Field of Classification Search
CPC ....... G08G 1/096783; G08G 1/096716; G08G 1/096758; G08G 1/056; G08G 1/092; G08G 1/096791; H04W 4/40; H04W 4/021; H04W 4/023; H04W 4/025; H04W 4/026; H04W 4/06; H04W 4/46; H04W 76/11; H04W 76/00; H04W 76/10; H04W 76/14;
(Continued)

(56) References Cited

U.S. PATENT DOCUMENTS

2018/0279183 A1* 9/2018 Song .................... H04W 36/08

FOREIGN PATENT DOCUMENTS

| CN | 205959187 U | * | 2/2017 | |
| CN | 106507449 A | * | 3/2017 | ............ H04W 4/02 |

(Continued)

*Primary Examiner* — James J Yang
*Assistant Examiner* — Anthony D Afrifa-Kyei
(74) *Attorney, Agent, or Firm* — BRYAN CAVE LEIGHTON PAISNER LLP

(57) ABSTRACT

Disclosed in one embodiment is a method for performing an operation for a first road side unit (RSU) in a wireless communication system, comprising the steps of: transmitting a first message to a second RSU; and receiving a second message from the second RSU, wherein the first message includes position information and a first position list of the first RSU, the second message includes position information and a second position list of the second RSU, and the first position list is updated with the position information and the second position list of the second RSU.

10 Claims, 35 Drawing Sheets

(58) Field of Classification Search
CPC ....... H04W 8/005; H04W 8/08; H04W 88/02; H04W 84/005; H04W 92/18; H04W 40/20; H04W 88/04; H04W 4/44; H04W 64/00; H04W 84/047; H04W 84/18; H04L 67/12; G01S 19/14; G01S 19/01; G01S 19/13; G01S 19/17; G01S 19/03; G01S 19/42; H04B 7/185; H04B 7/15507
See application file for complete search history.

(56) References Cited

FOREIGN PATENT DOCUMENTS

| | | | | | |
|---|---|---|---|---|---|
| CN | 106652461 | A | * | 5/2017 | |
| JP | 2014014039 | A | * | 1/2014 | |
| KR | 1020110121189 | A | | 11/2011 | |
| KR | 1020120031335 | A | | 4/2012 | |
| WO | 2017030348 | A1 | | 2/2017 | |
| WO | WO-2017049978 | A1 | * | 3/2017 | .............. H04W 4/04 |
| WO | 2018031458 | A1 | | 2/2018 | |

* cited by examiner (a)　　　　　　　　　(b)　　　　　　　　　(c)

● : Transmitting UE
◎ : Receiving UE

FIG. 10
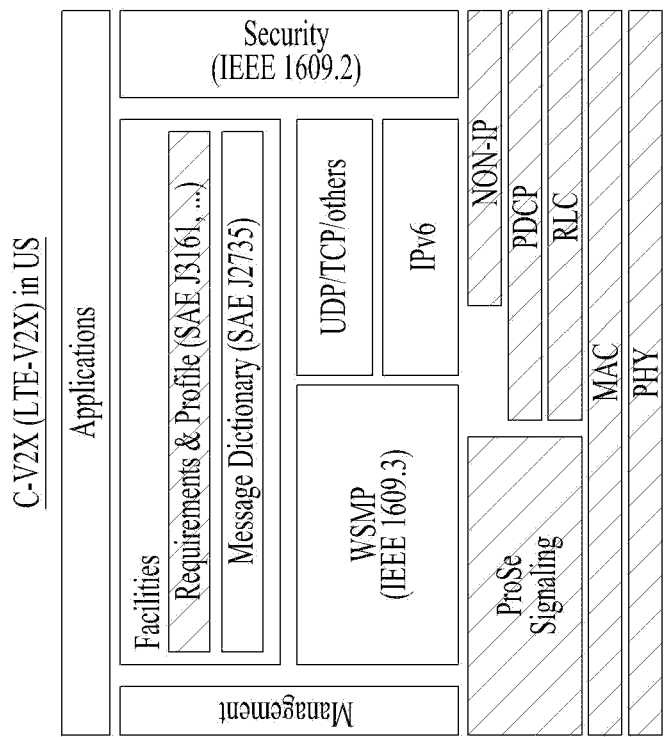
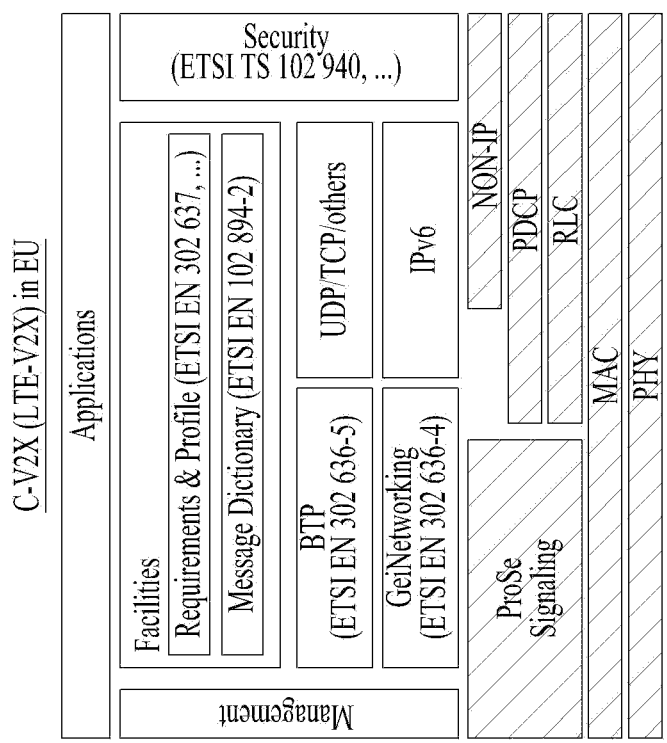

FIG. 16
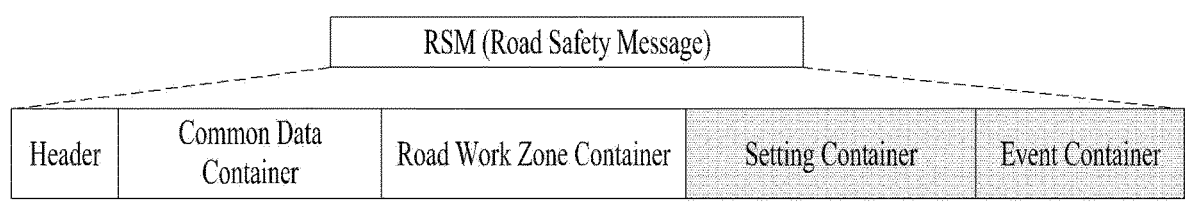
(a) V2I message extension for I2I
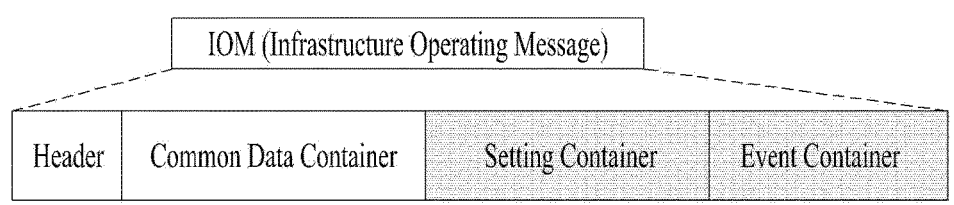
(b) I2I message

FIG. 17

| ASN. 1 Representation | |  |
|---|---|---|
| DF_SettingContainer | ::= SEQUENCE{ | |
|    Setting Type | INTEGER | |
|    TimeOutValue | INTEGER | |
|    PointPosition | DF_ReferancePosition | |
|    PointPositionList | SEQUENCE (SIZE(1..100)) OF DE_Position | |
|    } | | |

(a) Setting Container

| ASN. 1 Representation | | |
|---|---|---|
| DF_EventContainer | ::= SEQUENCE{ | |
|    EventType | INTEGER | |
|    EventID | INTEGER | |
|    EventCode | INTEGER | |
|    EventTime | DE_TimestampIts | ,Optional |
|    EventReleaseTime | DE_TimestampIts | ,Optional |
|    } | | |

(b) Event Container

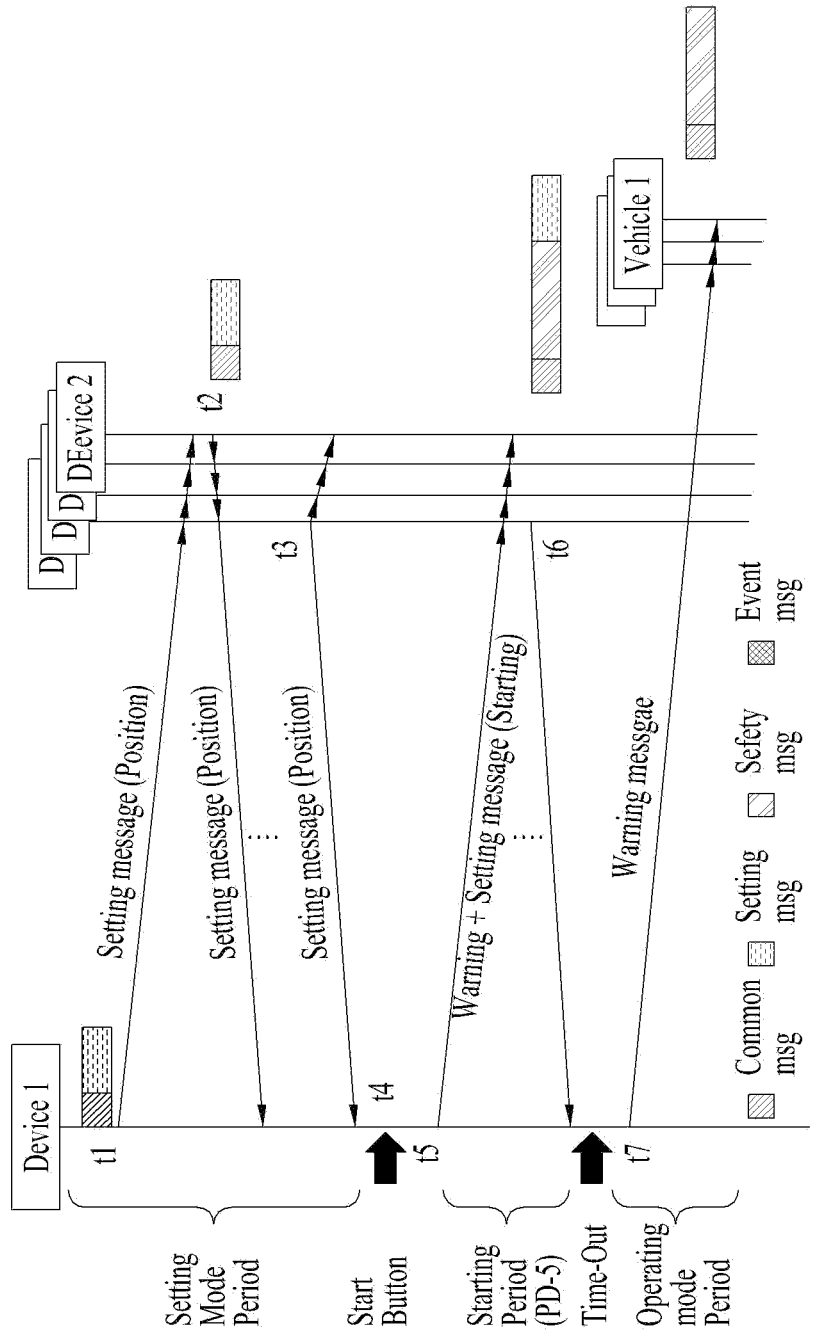

FIG. 21
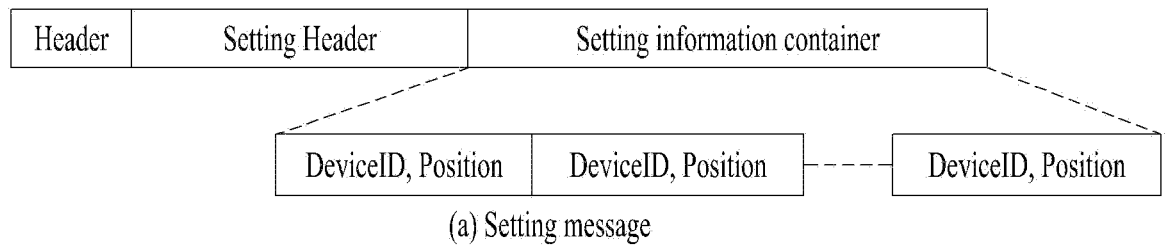
(a) Setting message
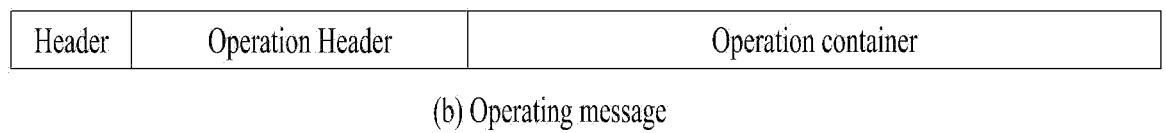
(b) Operating message

FIG. 22

| ASN. 1 Representation | | |
|---|---|---|
| DF_OperatingHeader | ::= SEQUENCE{ | |
| OperatingMessageType | INTEGER --{1:adv, 2:ack, 3:safety, 4:Event, 5:reserved} | |
| ServiceType | INTEGER , Optional | -- When Adv. mode |
| StationType | INTEGER , Optional | -- When Ack. mode |
| SefetyType | INTEGER , Optional | -- When Safety. mode |
| EventContainerType | INTEGER , Optional | -- When Event. mode |
| } | | |

(a) Operating Header

FIG. 23

| Header | Adv. Header |
|---|---| a) Advertisement message

| Header | Join Header | Vehicle Information |
|---|---|---| b) Join message

| Header | Safety Header | Road Work Zone Container | Target Safety container |
|---|---|---|---| c) safety message

| Header | Event Header | Event Container |
|---|---|---| d) event message

METHOD BY WHICH RSUS TRANSMIT AND RECEIVE SIGNALS IN WIRELESS COMMUNICATION SYSTEM

This application is the National Stage filing under 35 U.S.C. 371 of International Application No. PCT/KR2020/007680 filed on Jun. 12, 2020, which claims priority to Korean Patent Application No. 10-2019-0069583 filed on Jun. 12, 2019, the contents of which are all hereby incorporated by reference herein in their entirety.

TECHNICAL FIELD

The present disclosure relates to a wireless communication system and, more particularly, to a method of transmitting and receiving a signal by a road side unit (RSU) installed in a road work zone area and apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

DISCLOSURE

Technical Problem

An object of embodiment(s) is to allow a road side unit (RSU) to generate road work zone information by reflecting information changing in real time.

Another object of embodiment(s) is to allow an RSU to detect collisions or dangers occurring in a road work zone area in real time and notify nearby vehicle-to-everything (V2X) devices of the collisions or dangers.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of performing operations by a first road side unit (RSU) in a wireless communication system is provided. The method may include: transmitting a first message to a second RSU; and receiving a second message from the second RSU. The first message may include information on a location of the first RSU and a first location list, and the second message may include information on a location of the second RSU and a second location list. The first location list may be updated based on the information on the location of the second RSU and the second location list.

In another aspect of the present disclosure, a first RSU in a wireless communication system is provided. The first RSU may include: at least one processor; and at least one computer memory operably connected to the at least one processor and configured to store instructions that, when executed, cause the at least one processor to perform operations. The operations may include: transmitting a first message to a second RSU; and receiving a second message from the second RSU. The first message may include information on a location of the first RSU and a first location list, and the second message may include information on a location of the second RSU and a second location list. The first location list may be updated based on the information on the location of the second RSU and the second location list.

In a further aspect of the present disclosure, a computer-readable storage medium configured to store at least one computer program including instructions that, when executed by at least one processor, cause the at least one processor to perform operations for a user equipment (UE) is provided. The operations may include: transmitting a first message to a second RSU; and receiving a second message from the second RSU. The first message may include information on a location of a first RSU and a first location list, and the second message may include information on a location of the second RSU and a second location list. The first location list may be updated based on the information on the location of the second RSU and the second location list.

Each of the first location list and the second location list may include information on locations of one or more RSUs installed in a road work zone area.

The first message may be transmitted to the second RSU based on input of a setting button to the first RSU.

The first message may include setting type information, and the setting type information may indicate a start state based on input of a start button to the first RSU.

The first message may include a timeout time, and the transmission of the first message may be stopped based on a lapse of the timeout time after a start button is input to the first RSU.

The method may further include transmitting a warning message for a road work zone area to one or more vehicles based on the lapse of the timeout time after the start button is input to the first RSU.

Based on a change in the location of the first RSU, the first message may include information on the changed location of the first RSU.

Each of the first message and the second message may include event information, and the event information may include information on a dangerous situation occurring in a road work zone area.

The first RSU and the second RSU may be connected by unicast.

The first RSU may be an autonomous driving vehicle or included in an autonomous driving vehicle.

Advantageous Effects

According to an embodiment, information on a road work zone area that changes in real time may be generated accurately and rapidly through communication between road side units (RSUs).

According to an embodiment, collisions or dangers occurring in a road work zone area may be detected in real time, thereby ensuring the safety of the road work zone area.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the disclosure, illustrate embodiments of the disclosure and together with the description serve to explain the principle of the disclosure.

FIG. 10 illustrates an exemplary ITS station structure according to an embodiment of the present disclosure.

FIGS. 12 to 29 are diagrams for explaining embodiment(s) of the present disclosure.

BEST MODE

The embodiments In various embodiments of the present disclosure, "/" and "," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs 01-DMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 1:
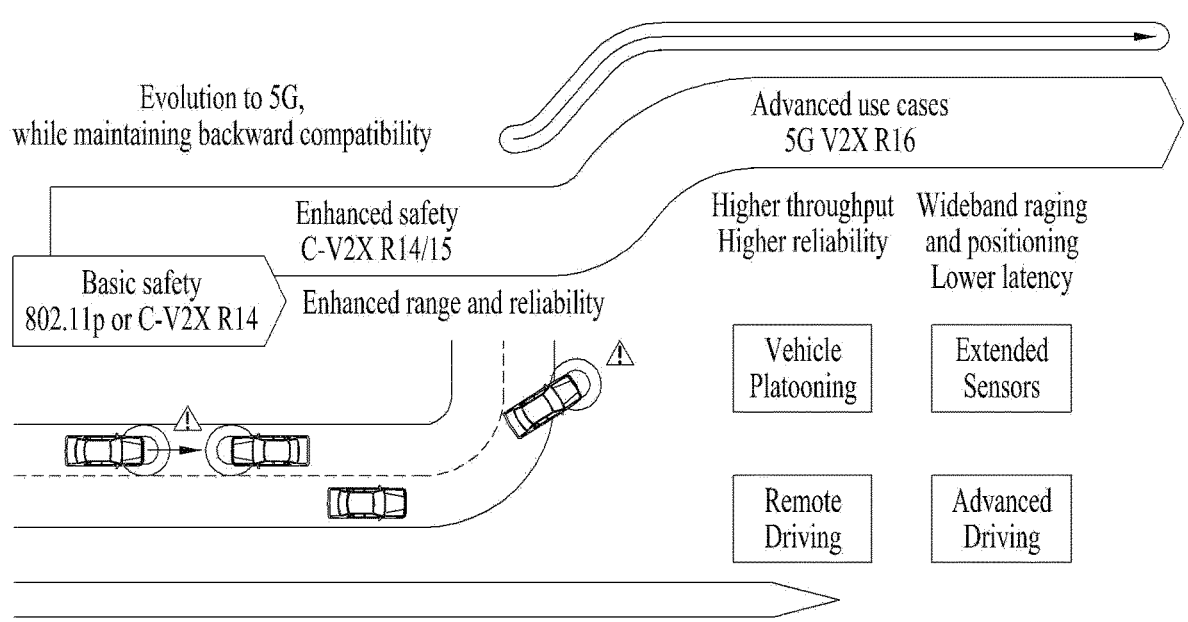
FIG. 1 is a diagram illustrating vehicle-to-everything (V2X) communication based on pre-new radio access technology (NR) RAT and V2X communication based on NR in comparison.
Figure 2:
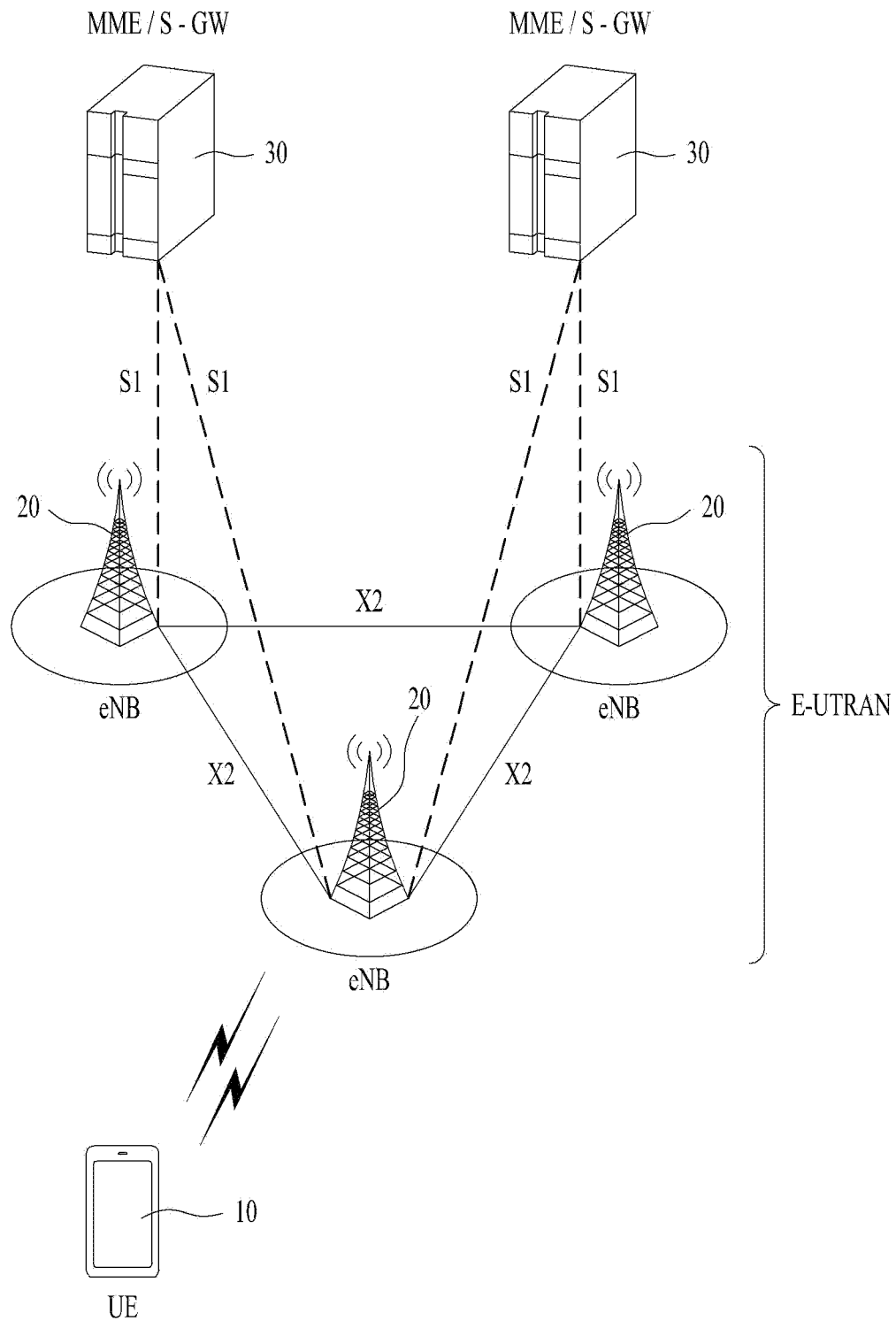
FIG. 2 is a diagram illustrating the structure of a long term evolution (LTE) system according to an embodiment of the present disclosure.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
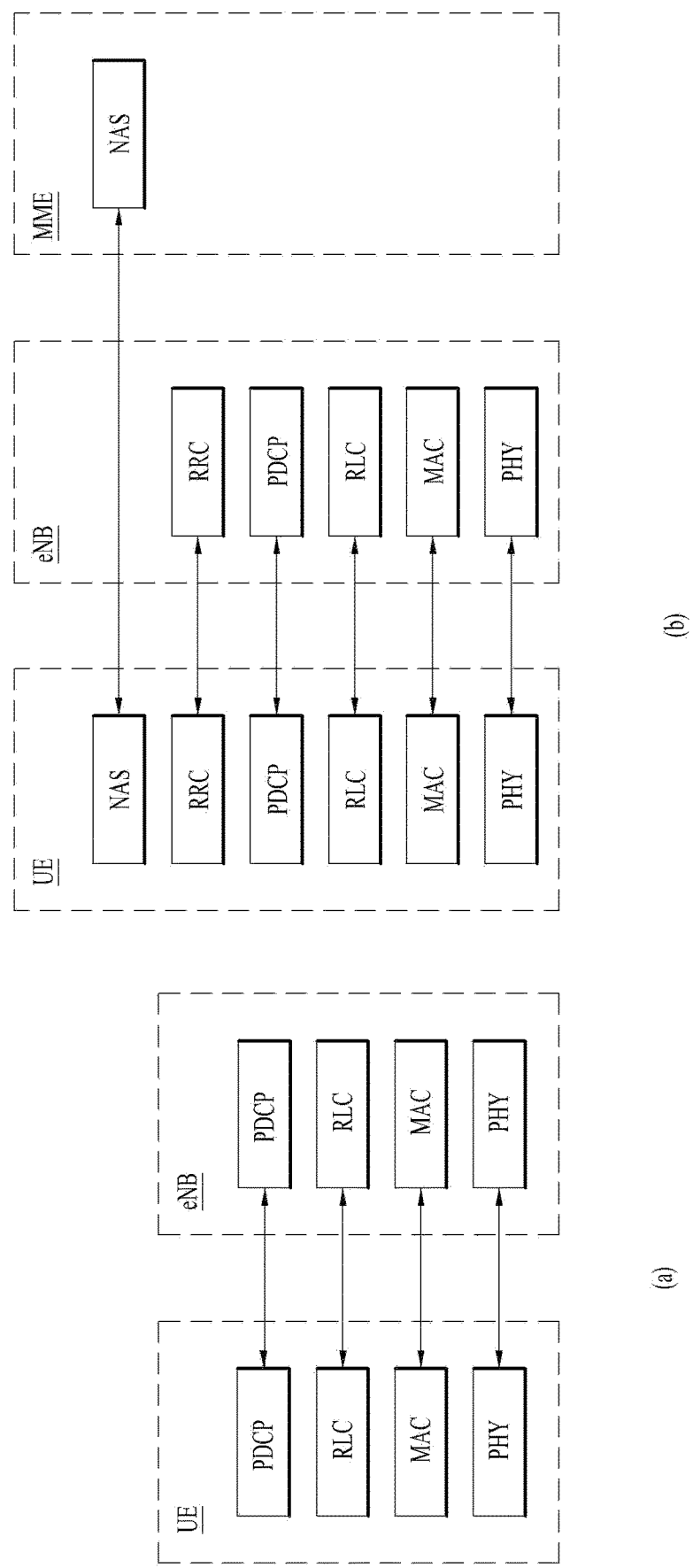
FIG. 3 is a diagram illustrating user-plane and control-plane radio protocol architectures according to an embodiment of the present disclosure.

FIG. 3(a) illustrates a user-plane radio protocol architecture according to an embodiment of the disclosure.

FIG. 3(b) illustrates a control-plane radio protocol architecture according to an embodiment of the disclosure. A user plane is a protocol stack for user data transmission, and a control plane is a protocol stack for control signal transmission.

Referring to FIGS. 3(a) and 3(b), the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbol in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 4:
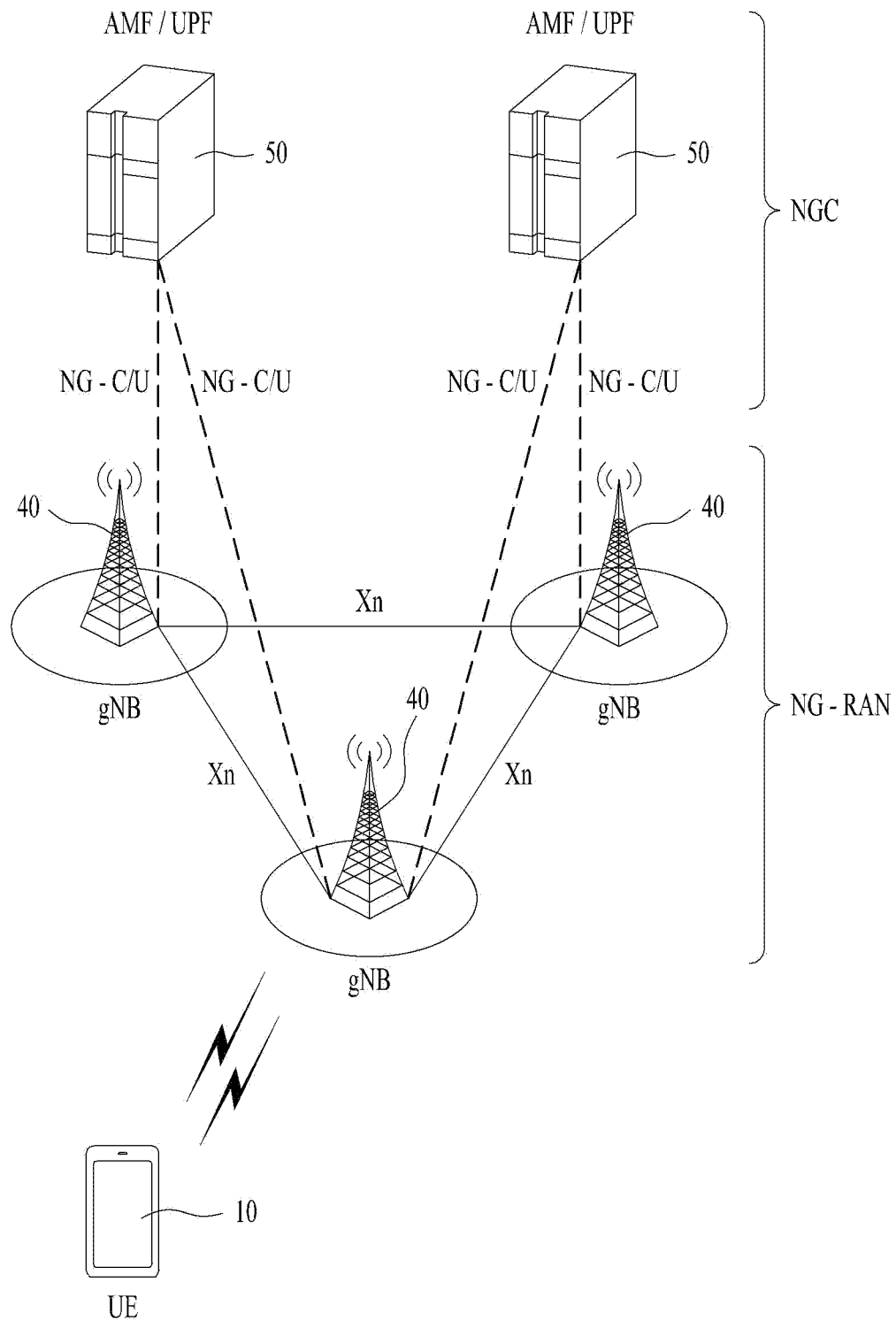
FIG. 4 is a diagram illustrating the structure of an NR system according to an embodiment of the present disclosure.

FIG. 4 illustrates the structure of an NR system according to an embodiment of the present disclosure.

Referring to FIG. 4, a next generation radio access network (NG-RAN) may include a next generation Node B (gNB) and/or an eNB, which provides user-plane and control-plane protocol termination to a UE. In FIG. 4, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 5:
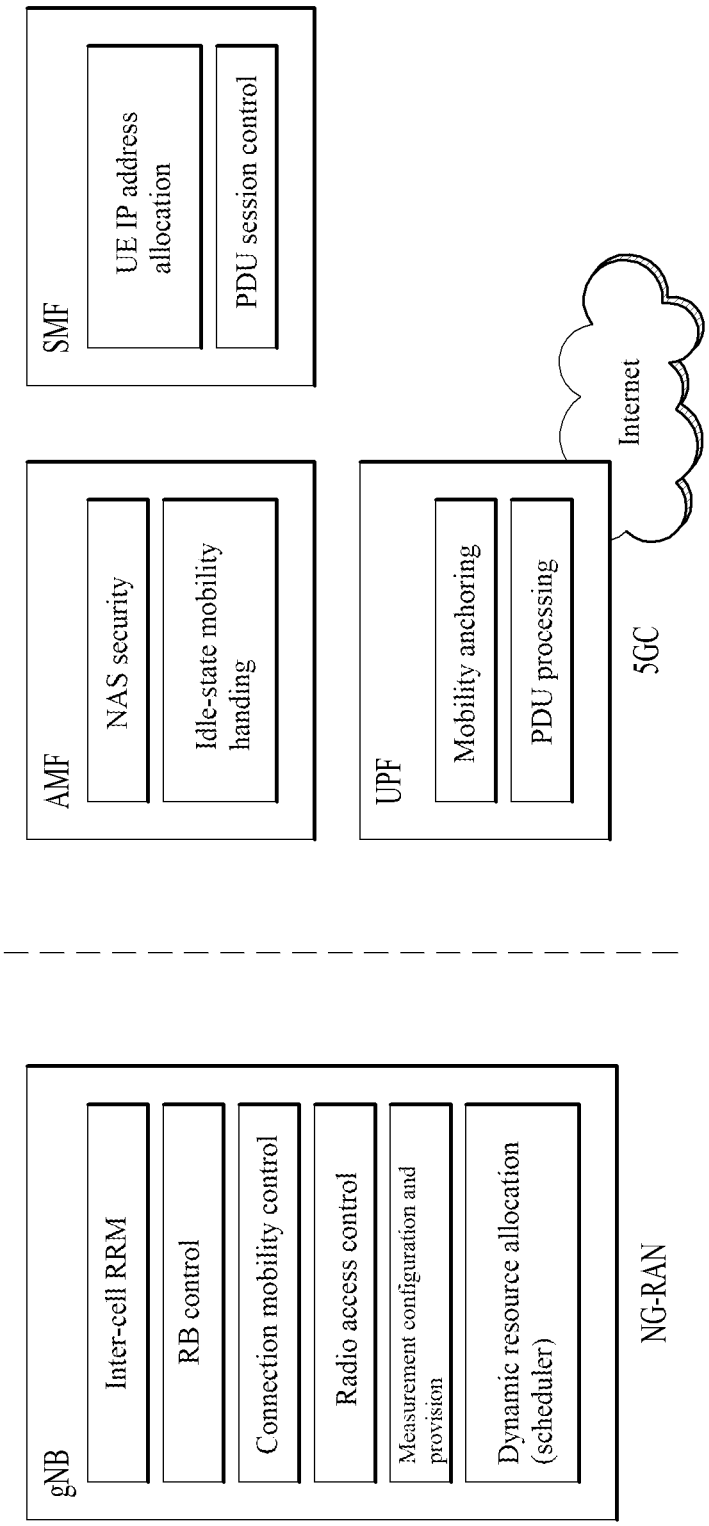
FIG. 5 is a diagram illustrating functional split between a next generation radio access network (NG-RAN) and a 5th generation core network (5GC) according to an embodiment of the present disclosure.

FIG. 5 illustrates functional split between the NG-RAN and the 5GC according to an embodiment of the present disclosure.

Referring to FIG. 5, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control FIG. 6 illustrates a radio frame structure in NR, to which embodiment(s) of the present disclosure is applicable.

Figure 6:
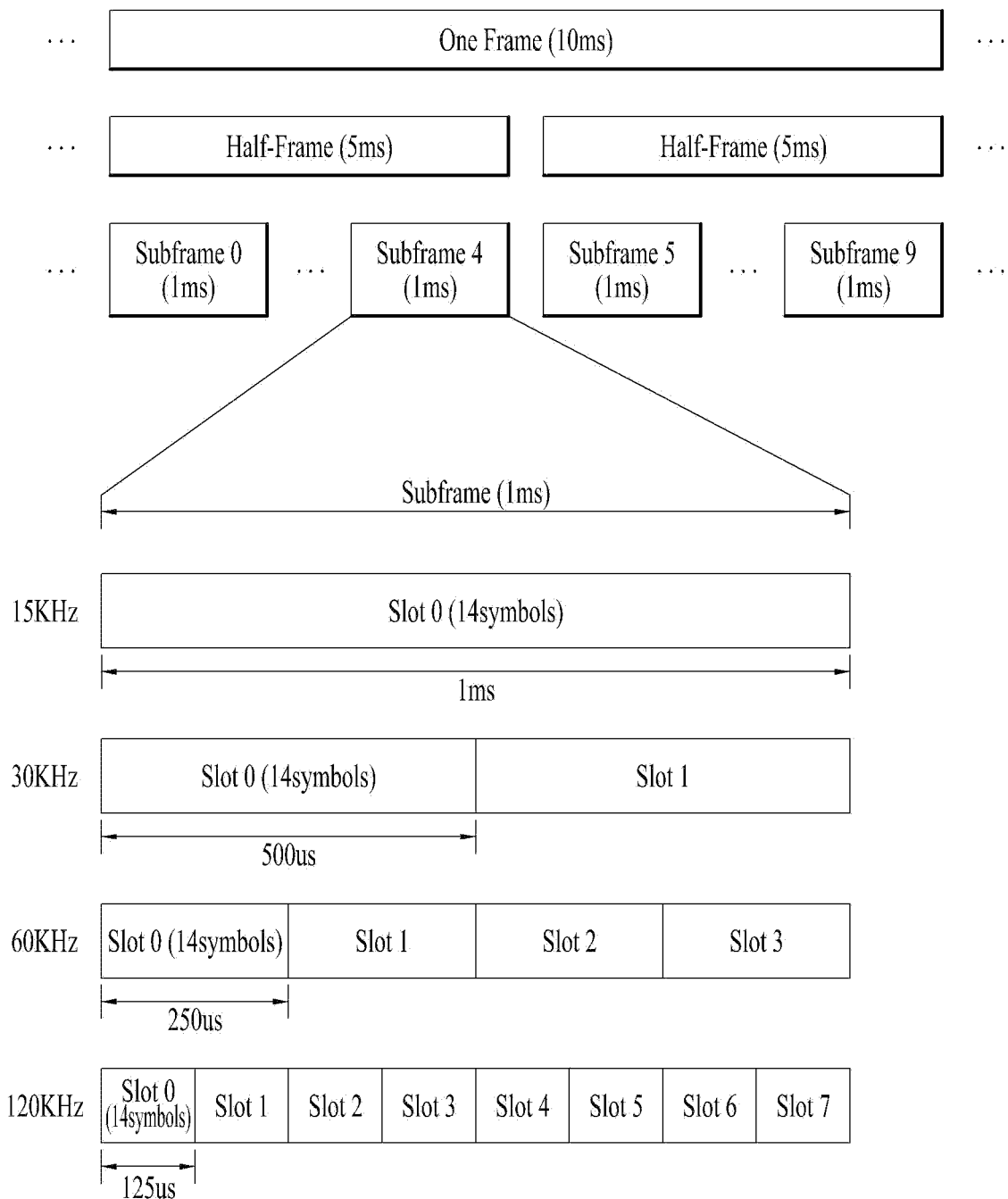
FIG. 6 is a diagram illustrating the structure of an NR radio frame to which embodiment(s) of the present disclosure is applicable.

Referring to FIG. 6, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration μ in the NCP case.

TABLE 1

| SCS (15 * 2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15 * 2^u) | $N^{slot}_{symb}$ | $N^{frame,u}_{slot}$ | $N^{subframe,u}_{slot}$ |
|---|---|---|---|
| 600 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells.

In NR, various numerologies or SCSs may be supported to support various 5G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in [Table 4]. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 7:
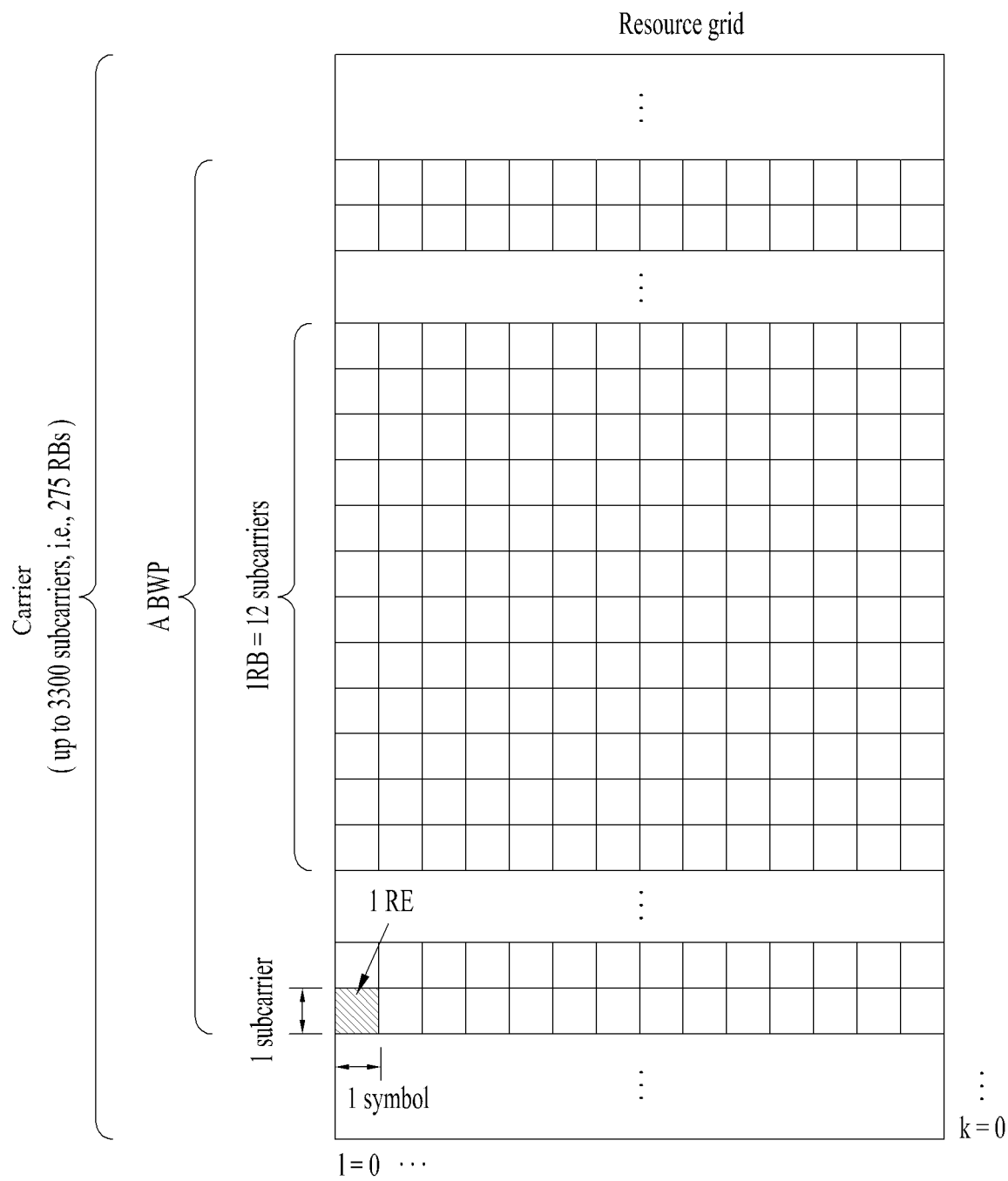
FIG. 7 is a diagram illustrating a slot structure in an NR frame according to an embodiment of the present disclosure.

FIG. 7 illustrates a slot structure in an NR frame according to an embodiment of the present disclosure.

Referring to FIG. 7, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Hereinafter, vehicle-to-everything (V2X) or sidelink (SL) communication will be described.

Figure 8:
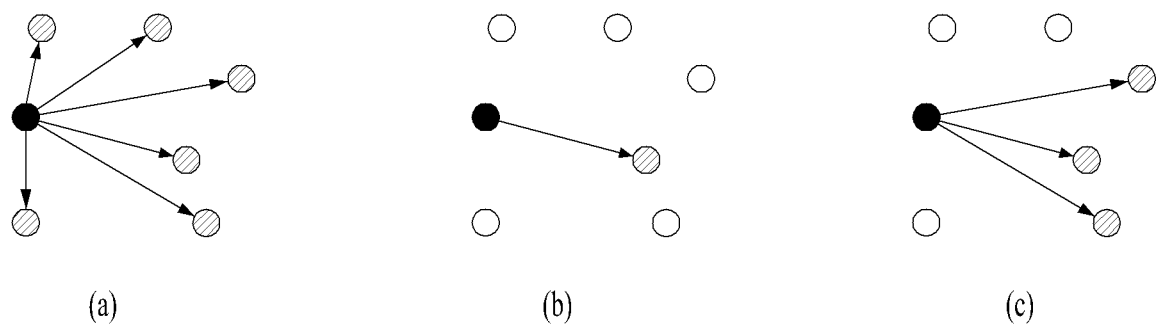
FIG. 8 is a diagram illustrating three cast types according to an embodiment of the present disclosure.

FIG. 8 illustrates three cast types according to an embodiment of the present disclosure.

Specifically, FIG. 8(a) illustrates broadcast-type SL communication, FIG. 8(b) illustrates unicast-type SL communication, and FIG. 8(c) illustrates groupcast-type SL communication. In unicast-type SL communication, a UE may perform one-to-one communication with another UE. In groupcast-type SL communication, the UE may perform SL communication with one or more UEs of a group to which the UE belongs. In various embodiments of the present disclosure, SL groupcast communication may be replaced with SL multicast communication, SL one-to-many communication, and so on.

Now, a description will be given of a CAM and a DENM will be described.

In V2V communication, a CAM of a periodic message type and a DENM of an event-triggered message type may be transmitted. The CAM may include basic vehicle information, such as dynamic state information about a vehicle like a direction and a speed, vehicle static data like dimensions, exterior lighting conditions, route details, and so on. The CAM may be 50 to 300 bytes long. The CAM is broadcast and has a latency requirement below 100 ms. The DENM may be a message generated in a sudden situation such as a vehicle breakdown or accident. The DENM may be shorter than 3000 bytes, and receivable at any vehicle within a transmission range. The DENM may have a higher priority than the CAM.

Now, RRC connection establishment between UEs will be described.

For V2X or SL communication, a transmitting UE may need to establish a (PC5) RRC connection with a receiving UE. For example, a UE may obtain a V2X-specific SIB. For a UE with data to be transmitted, which is configured with V2X or SL transmission by a higher layer, when at least a frequency configured for transmission of the UE for SL communication is included in the V2X-specific SIB, the UE may establish an RRC connection with another UE without including a transmission resource pool for the frequency. For example, once the RRC connection is established between the transmitting UE and the receiving UE, the transmitting UE may perform unicast communication with the receiving UE via the established RRC connection.

When the RRC connection is established between the UEs, the transmitting UE may transmit an RRC message to the receiving UE.

Now, an HARQ procedure will be described.

An error compensation technique for ensuring communication reliability may include a forward error correction (FEC) scheme and an automatic repeat request (ARQ) scheme. In the FEC scheme, an error in a receiver may be corrected by adding an extra error correction code to information bits. Although the FEC scheme offers the benefits of a short time delay and no need for separately exchanging information between a transmitter and a receiver, the FEC scheme has decreased system efficiency in a good channel environment. The ARQ scheme may improve the transmission reliability. Despite the advantage, the ARQ scheme incurs a time delay and has decreased system efficiency in a poor channel environment.

HARQ is a combination of FEC and ARQ. In HARQ, it is determined whether data received in the PHY layer includes an error that is not decodable, and upon generation of an error, a retransmission is requested to thereby improve performance.

In SL unicast and groupcast, HARQ feedback and HARQ combining in the PHY layer may be supported. For example, when the receiving UE operates in resource allocation mode 1 or 2, the receiving UE may receive a PSSCH from the transmitting UE, and transmit an HARQ feedback for the PSSCH in a sidelink feedback control information (SFCI) format on a physical sidelink feedback channel (PSFCH).

For example, SL HARQ feedback may be enabled for unicast. In this case, in a non-code block group (non-CBG) operation, when the receiving UE decodes a PSCCH directed to it and succeeds in decoding an RB related to the PSCCH, the receiving UE may generate an HARQ-ACK and transmit the HARQ-ACK to the transmitting UE. On the other hand, after the receiving UE decodes the PSCCH directed to it and fails in decoding the TB related to the PSCCH, the receiving UE may generate an HARQ-NACK and transmit the HARQ-NACK to the transmitting UE.

For example, SL HARQ feedback may be enabled for groupcast. For example, in a non-CBG operation, two HARQ feedback options may be supported for groupcast.

(1) Groupcast option 1: When the receiving UE decodes a PSCCH directed to it and then fails to decode a TB related to the PSCCH, the receiving UE transmits an HARQ-NACK on a PSFCH to the transmitting UE. On the contrary, when the receiving UE decodes the PSCCH directed to it and then succeeds in decoding the TB related to the PSCCH, the receiving UE may not transmit an HARQ-ACK to the transmitting UE.

(2) Groupcast option 2: When the receiving UE decodes a PSCCH directed to it and then fails to decode a TB related to the PSCCH, the receiving UE transmits an HARQ-NACK on a PSFCH to the transmitting UE. On the contrary, when the receiving UE decodes the PSCCH directed to it and then succeeds in decoding the TB related to the PSCCH, the receiving UE may transmit an HARQ-ACK to the transmitting UE on the PSFCH.

For example, when groupcast option 1 is used for SL HARQ feedback, all UEs performing groupcast communication may share PSFCH resources. For example, UEs belonging to the same group may transmit HARQ feedbacks in the same PSFCH resources.

For example, when groupcast option 2 is used for SL HARQ feedback, each UE performing groupcast communication may use different PSFCH resources for HARQ feedback transmission. For example, UEs belonging to the same group may transmit HARQ feedbacks in different PSFCH resources.

For example, when SL HARQ feedback is enabled for groupcast, the receiving UE may determine whether to transmit an HARQ feedback to the transmitting UE based on a transmission-reception (TX-RX) distance and/or an RSRP.

For example, in the case of TX-RX distance-based HARQ feedback in groupcast option 1, when the TX-RX distance is less than or equal to a communication range requirement, the receiving UE may transmit an HARQ feedback for the PSSCH to the transmitting UE. On the other hand, when the TX-RX distance is larger than the communication range requirement, the receiving UE may not transmit the HARQ feedback for the PSSCH to the transmitting UE. For example, the transmitting UE may inform the receiving UE of the location of the transmitting UE by SCI related to the PSSCH. For example, the SCI related to the PSSCH may be second SCI. For example, the receiving UE may estimate or obtain the TX-RX distance based on the locations of the receiving UE and the transmitting UE. For example, the receiving UE may decode the SCI related to the PSSCH, so as to know the communication range requirement used for the PSSCH.

For example, in resource allocation mode 1, a time between the PSFCH and the PSSCH may be configured or preconfigured. In unicast and groupcast, when a retransmission is needed on SL, this may be indicated to the BS by an in-coverage UE using a PUCCH. The transmitting UE may transmit an indication to its serving BS in the form of a scheduling request (SR)/buffer status report (BSR) instead of an HARQ ACK/NACK. Further, even though the BS fails to receive the indication, the BS may schedule SL retransmission resources for the UE. For example, in resource allocation mode 2, the time between the PSFCH and the PSSCH may be configured or preconfigured.

For example, from the viewpoint of transmission of a UE on a carrier, time division multiplexing (TDM) between a PSCCH/PSSCH and a PSFCH may be allowed for a PSFCH format for the SL in a slot. For example, a sequence-based PSFCH format with one symbol may be supported. The one symbol may not be an AGC period. For example, the sequence-based PSFCH format may be applied to unicast and groupcast.

For example, PSFCH resources may be preconfigured or periodically configured to span N slot periods in slots related to a resource pool. For example, N may be set to one or more values equal to or larger than 1. For example, N may be 1, 2 or 4. For example, an HARQ feedback for a transmission in a specific resource pool may be transmitted only on a PSFCH in the specific resource pool.

For example, when the transmitting UE transmits the PSSCH in slot #X to slot #N to the receiving UE, the receiving UE may transmit an HARQ feedback for the PSSCH in slot #(N+A) to the transmitting UE. For example, slot #(N+A) may include PSFCH resources. For example, A may be a smallest integer greater than or equal to K. For example, K may be the number of logical slots. In this case, K may be the number of slots in the resource pool. Alternatively, for example, K may be the number of physical slots. In this case, K may be the number of slots inside and outside the resource pool.

For example, when the receiving UE transmits an HARQ feedback in PSFCH resources in response to one PSSCH transmitted by the transmitting UE, the receiving UE may determine the frequency area and/or code area of the PSFCH resources based on an implicit mechanism in the configured resource pool. For example, the receiving UE may determine the frequency area and/or code area of the PSFCH resources based on at least one of a slot index related to the PSCCH/PSSCH/PSFCH, a subchannel related to the PSCCH/PSSCH, or an ID identifying each receiving UE in a group for HARQ feedback based on groupcast option 2. Additionally or alternatively, for example, the receiving UE may determine the frequency area and/or code area of the PSFCH resources based on at least one of an SL RSRP, a signal-to-interference and noise ratio (SINR), an L1 source ID, or location information.

For example, when an HARQ feedback transmission of the UE on the PSFCH overlaps with an HARQ feedback reception of the UE on the PSFCH, the UE may select either the HARQ feedback transmission on the PSFCH or the HARQ feedback reception on the PSFCH based on a priority rule. For example, the priority rule may be based on a minimum priority indication of the related PSCCH/PSSCH.

For example, when HARQ feedback transmissions of the UE for a plurality of UEs overlap with each other on the PSFCH, the UE may select a specific HARQ feedback transmission based on the priority rule. For example, the priority rule may be based on the minimum priority indication of the related PSCCH/PSSCH.

Hereinafter, an intelligent transport systems (ITS) will be described.

The ITS refers to a system that automates the operation and management of a transportation system and improves the efficiency and safety of transportation by providing traffic information and services with incorporation of advanced technology into transportation means and transportation facilities. The ITS may include a high-pass system used when vehicles are in driving, a bus arrival information system used when riding public transportation, and real-time signal control according to traffic conditions. The conventional ITS has been mainly applied to a traffic management-oriented system that provides information to vehicles in one direction.

As technology has advanced, a traffic safety-oriented cooperative ITS (C-ITS) has been developed to enable proactive response and prevention of emergencies rapidly and actively by continuously sharing data between vehicles and between a vehicle and infrastructure in both directions. The C-ITS is a system that prevents traffic accidents by enabling a vehicle to communicate with other vehicles or infrastructure installed on the road while the vehicle is in driving checking or warning surrounding traffic conditions, sudden stops, and risk information such as falling objects in real time.

Hereinafter, vehicle communication for the ITS will be described.

The ITS based on V2X communication is mainly composed of an access layer, a network & transport layer, a facilities layer, an application layer, a security entity, a management entity, and so on.

Vehicle communication may be applied to various scenarios such as vehicle-to-vehicle (V2V) communication, vehicle-to-BS (V2N or N2V) communication, vehicle-to-road side unit (RSU) (V2I or I2V) communication, RSU-to-RSU (I2I) communication, vehicle-to-pedestrian (V2P or P2V) communication, RSU-to-pedestrian (I2P or P2I) communication, and so on. A vehicle, a BS, an RSU, a pedestrian, etc., which are subjects of vehicle communication, are referred to as an ITS station.

Hereinafter, an ITS reference architecture will be described.

Figure 9:
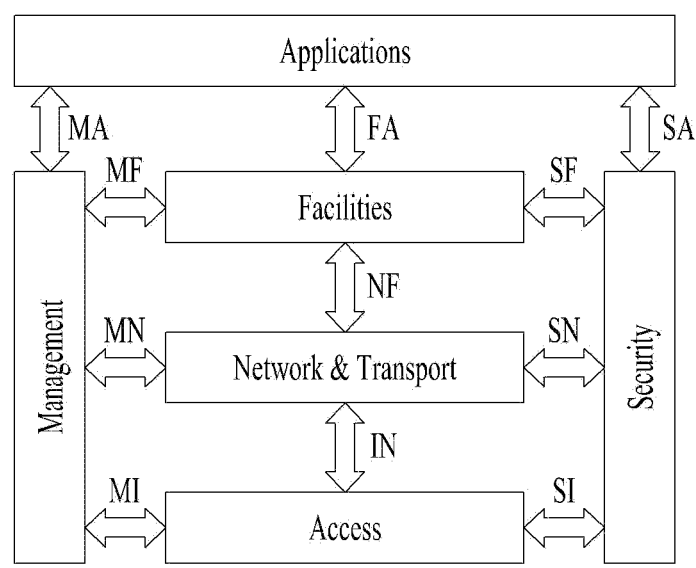
FIG. 9 illustrates an intelligent transport systems (ITS) reference architecture according to an embodiment of the present disclosure.

FIG. 9 illustrates an ITS reference architecture according to an embodiment of the present disclosure.

FIG. 9 shows the ITS station reference architecture defined in ISO 21217/EN 302 665. The ITS station reference architecture is composed of the access layer, network & transport layer, facilities layer, entities for security and management, and application layer, which is located at the top. The ITS station reference architecture follows a layered OSI model.

The features of the ITS station reference architecture will be described based on the OSI model of FIG. 9. The access layer of the ITS station corresponds to OSI layer 1 (physical layer) and OSI layer 2 (data link layer). The network & transport layer of the ITS station corresponds to OSI layer 3 (network layer) and OSI layer 4 (transport layer). The facilities layer of the ITS station corresponds to OSI layer 5 (session layer), OSI layer 6 (presentation layer), and OSI layer 7 (application layer).

The application layer located at the top of the ITS station performs a function of actually implementing and supporting a use case, and the application layer may be selectively used depending on use cases. The management entity manages all layers including communication and operation of the ITS station. The security entity provides security services for all layers. Each layer of the ITS station exchanges data to be transmitted or received through vehicle communication and additional information for various purposes via interfaces therebetween.

FIG. 10 illustrates an exemplary ITS station structure according to an embodiment of the present disclosure.

FIG. 10 shows an exemplary ITS station structure capable of being designed and applied based on the ITS station reference architecture shown in FIG. 9.

The main concept of the structure of FIG. 9 is to allow each layer having a specific function to distribute and perform communication processing between two ends: vehicles/users configured in a communication network. That is, when a vehicle-to-vehicle message is generated, a vehicle and ITS system (or another ITS-related terminal/system) may transfer data through each layer down one layer at a time, and a vehicle or ITS system (or another ITS-related terminal/system) receiving the message may transfer data up one layer at a time when the message arrives.

The ITS based on vehicle and network communication is systematically designed in consideration of various access technologies, network protocols, communication interfaces, and so on to support various use cases. The roles and functions of each layer described below may vary according to circumstances. Hereinafter, the functions of the facilities layer will be briefly described.

The facilities layer supports to effectively implement various use cases defined in the upper application layer. For example, the facilities layer performs application support, information support, and/or session/communication support.

Figure 11:
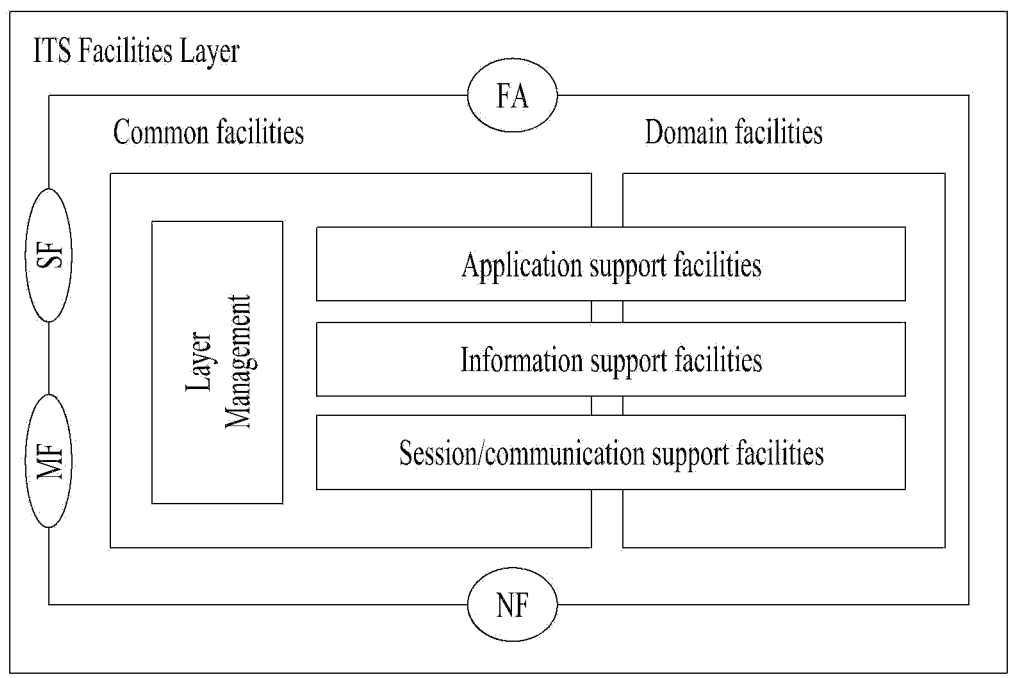
FIG. 11 illustrates an exemplary structure of a facilities layer according to an embodiment of the present disclosure.

FIG. 11 illustrates an exemplary structure of the facilities layer according to an embodiment of the present disclosure.

The facilities layer basically supports the functions of the upper three layers of the OSI model, for example, the session layer, presentation layer, and application layer. Specifically, as shown in FIG. 11, the facilities layer provides the following facilities for the ITS: application support, information support, session/communication support, etc. Here, the facilities mean components that provide functionality, information, and data.

Application support facilities: The application support facilities are facilities that support the operations of the ITS application (e.g., ITS message generation, transmission/reception with lower layers, and management thereof). Examples thereof include a cooperative awareness (CA) basic service, a decentralized environmental notification (DEN) basic service, and the like. In the future, facilities entities and related messages may be additionally defined for new services such as cooperative adaptive cruise control (CACC), platooning, a vulnerable roadside user (VRU), a collective perception service (CPS), etc.

Information support facilities: The information support facilities are facilities that provide common data information or databases used for various ITS applications. Examples thereof include a local dynamic map (LDM), etc.

Session/communication support facilities: The session/communication support facilities are facilities that provide services for communications and session management. Examples thereof include addressing mode, session support, etc.

The facilities may be divided into common facilities and domain facilities.

Common facilities: The common facilities are facilities that provide common services or functions required for various ITS applications and ITS station operations. Examples thereof include time management, position management, services management, etc.

Domain facilities: The domain facilities are facilities that provide special services or functions required only for some (one or more) ITS applications. Examples thereof include a DEN basic service for road hazard warning (RHW) applications. The domain facilities are optional functions. That is, the domain facilities are not used unless supported by the ITS station.

The layer management serves to manage and service information related to operation and security of the facilities layer, and related information is transferred and shared in two ways through MF (i.e., an interface between the management entity and facilities layer) and SF (i.e., an interface between the security entity and facilities layer) (or MF-SAP, SF-SAP, etc.). A request from the application layer to the facilities layer or a service message and related information from the facilities layer to the application layer may be transferred through FA (or FA-SAP). A service message and related information between the facilities layer and lower networking & transport layer may be transferred bidirectionally through NF (i.e., an interface between the networking & transport layer and facilities layer) (or NF-SAP).

Embodiments

In the conventional Day 1 technology, safety support services based on V2V have been mainly supported. In the recent Day 2 technology, infrastructure based services have been added, and services for providing user convenience as well as safety have been developed. However, the Day 2 technology is limited to I2V services, and only predetermined safety alert information is broadcast to vehicles. A road work zone guide technology developed in Day 2 provides simple services. For example, predetermined road work zone information (e.g., road work zone name, road work zone period, road work zone area, or road work zone characteristics) is transmitted to vehicles from V2X devices installed around a road work zone. In this case, there are disadvantages in that the road work zone may not be accurately provided and it is difficult to handle dynamic changes in the road work zone such as road lane painting.

When road work is carried out on an existing road, information boards such rubber cones and signboards are used to guide vehicles to slow down. With the recent development of V2X technology, devices and standards for enabling vehicles equipped with V2X receivers to obtain road work zone information in advance at remote locations are being developed. To this end, the location and period of the road work are defined and set in advance, and then the road work information is included in a message such as a CAM (BSM) and transmitted from the V2X device.

Figure 12:
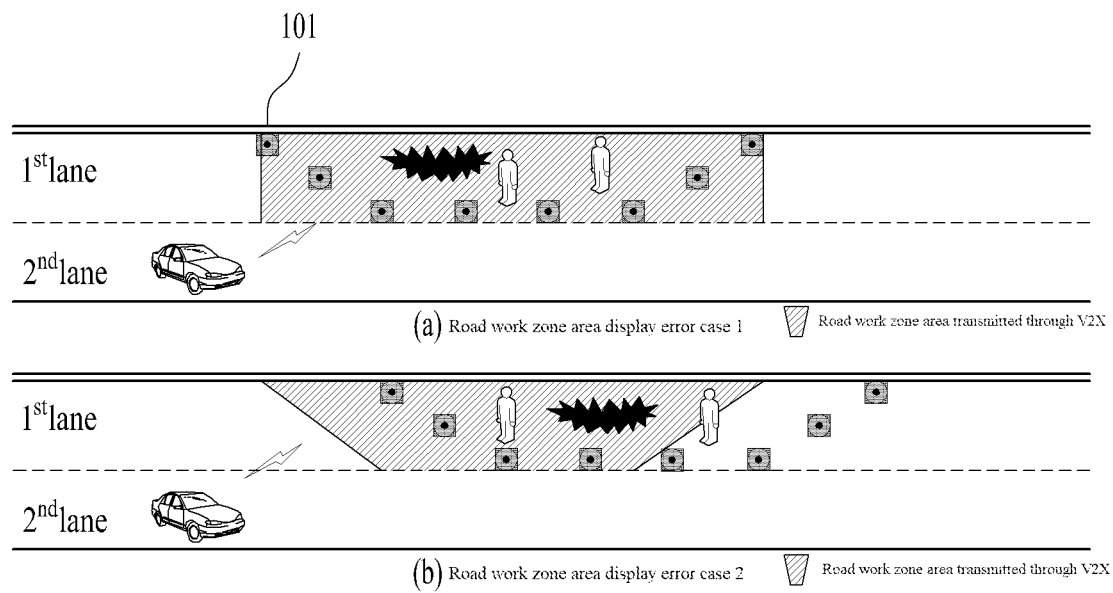

FIG. 12 is a diagram for explaining a general method of transmitting road work zone information.

Referring to FIG. 12, a rubber cone 101 indicating the area of a road work zone may be installed around the road work zone for the safety of vehicles. In addition, the rubber cone may be equipped with a communication system and thus operate as an RSU capable of performing V2X communication with nearby vehicles. In general, the RSU may transmit road work zone information including location or period information on the road work zone to nearby vehicles in a message such as a CAM or BSM. Since the road work zone information is defined and set in advance, the RSU may transmit only the initially set road work zone information to nearby vehicles even if the actual area of the road work zone is changed or the location of the RSU is changed.

Referring to FIG. 12(a), conventional road work zone information may be displayed in units of lanes. However, since the actual road work zone area corresponds to part of a lane rather than the entirety of the lane, there may be a problem that the actual road work zone area does not exactly match with the road work zone area included in the road work zone information.

Referring to FIG. 12(b), conventional road work zone information is set by defining the location and period of a road work zone in advance. As a result, in the case of work that proceeds along a road such as lane painting, there may be a problem that the location of the actual road work zone does not match with information on the location of the road work zone transmitted through V2X. That is, the conventional road work zone information transmission method may have a problem that it is difficult to indicate the exact location of the road work zone in real time.

[Proposed Configurations]

The present disclosure proposes a method of automatically configuring a road work zone area through I2I communication based on installation of V2X devices, instead of determining the road work zone area in advance as described above.

Figure 13:
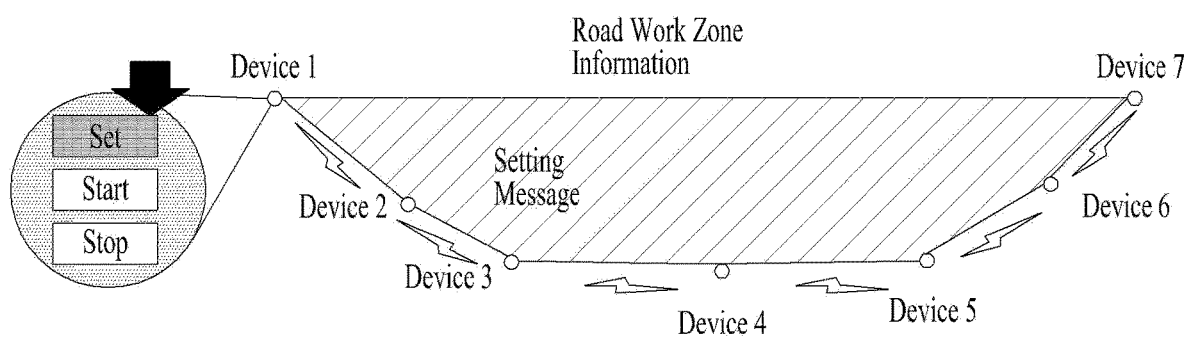

FIG. 13 is a diagram for explaining a method of configuring a road work zone area according to embodiment(s) of the present disclosure.

Referring to FIG. 13, devices 1 to 7 may be V2X devices capable of V2X communication, which are installed around the road work zone area.

In this document, each of devices 1 to 7 may referred to as a device, a V2X device, a road work zone guide device, an RSU, or infrastructure.

Each device may configure the road work zone area by transmitting a setting message including information on its own location to each other. In the initial installation operation of configuring the road work zone area, the road work zone area may be configured through I2I communication based on V2X devices.

For example, road work zone workers or users may configure common information such as road work schedules and road work details for each of devices 1 to 7 before placing each device at each position. Thereafter, the road work zone worker may install each device one by one around the road work zone area. When installing each device, the road work zone worker may inform the completion of the installation by pressing a set button on the V2X device. The installed V2X device receives location information through the global positioning system (GPS) and transmits information on its installed location to adjacent devices. The road work zone worker may install each device in the same way around the road work zone area. For example, after inputting road work zone information into each device, the road work zone worker may install device 1 at a specific location in the road work zone area and press the set button of device 1. Then, device 1 may receive its location information through the GPS and transmit its location information to each of devices 2 to 7. In addition, the road work zone worker may perform the same work for devices 2 to 7, and each device may share its location information with other devices.

After completing the installation of devices 1 to 7, the road work zone worker may drive the corresponding road work zone guide device by pressing a start button of one of the devices. When one start button is pressed, each of the devices transmits an I2I message, (e.g., setting message) to initiate a road work zone guide service (I2V). Each device transmits the setting message for a predetermined time (timeout) so that all devices provide the road work zone guide service.

Each of devices 1 to 7 may alert a danger in an emergency through I2I as well as provide the road work zone guide service as the normal road work zone guide device. When a vehicle driving in the vicinity hits the road work zone guide device due to careless driving or intrudes into the road work zone area, each device may share the danger with each other based on I2I communication and inform vulnerable road users (VRUs) working in the vicinity of the danger, thereby protecting the VRUs (road work zone workers) working in the road work zone.

Figure 14:
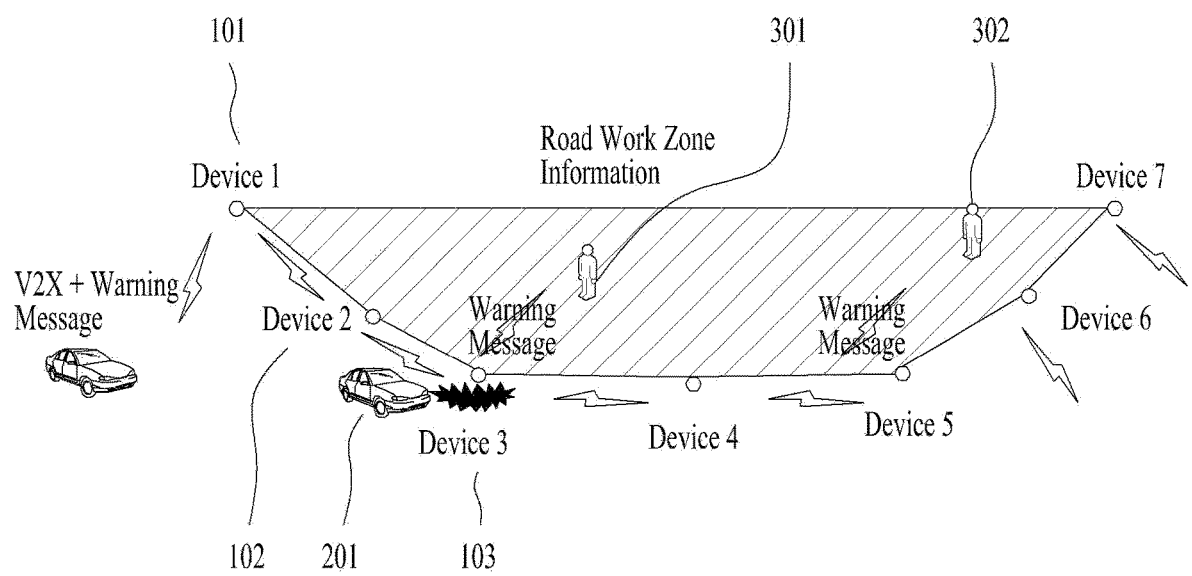

FIG. 14 is a diagram for explaining a danger warning method according to embodiment(s) of the present disclosure.

Referring to FIG. 14, device 1 101 to device 7 may be installed within the area of a road work zone, and there may be a dangerous situation where a vehicle 201 driving around the road work zone hits device 3 103. Device 3 103 may detect an impact through an impact sensor. If the impact is confirmed, device 3 may transmit a warning message to adjacent devices by using an I2I message in addition to an I2V message. Upon receiving the warning message, the adjacent devices may also forward the warning message to the surroundings, thereby giving a warning to a VRU (road work zone worker) 302 working in the road work zone out of V2X coverage.

In other words, when the vehicle 201 hits device 3 103 installed in the road work zone area, that is, when an accident occurs, device 3 103 may sense the impact through the impact sensor. Before the accident, device 3 continuously transmits the I2V message including road work zone area information to nearby vehicles. When device 3 detects the impact and recognizes the occurrence of the accident, device 3 may transmit the I2I message to warn the danger to the adjacent devices in addition to the previously transmitted I2V message. Thus, device 3 may inform other devices of the fact that the accident has occurred and inform a road work zone worker working from a distance of the danger. When it is difficult for the road work zone worker to recognize the fact that the accident has occurred within the road work zone area because the road work zone area is very wide, the danger may be informed according to an embodiment proposed in the present disclosure.

According to embodiment(s) of the present disclosure, the area of the road work zone may be adjusted in real time, compared to the prior art where the area of the road work zone is predetermined.

Figure 15:
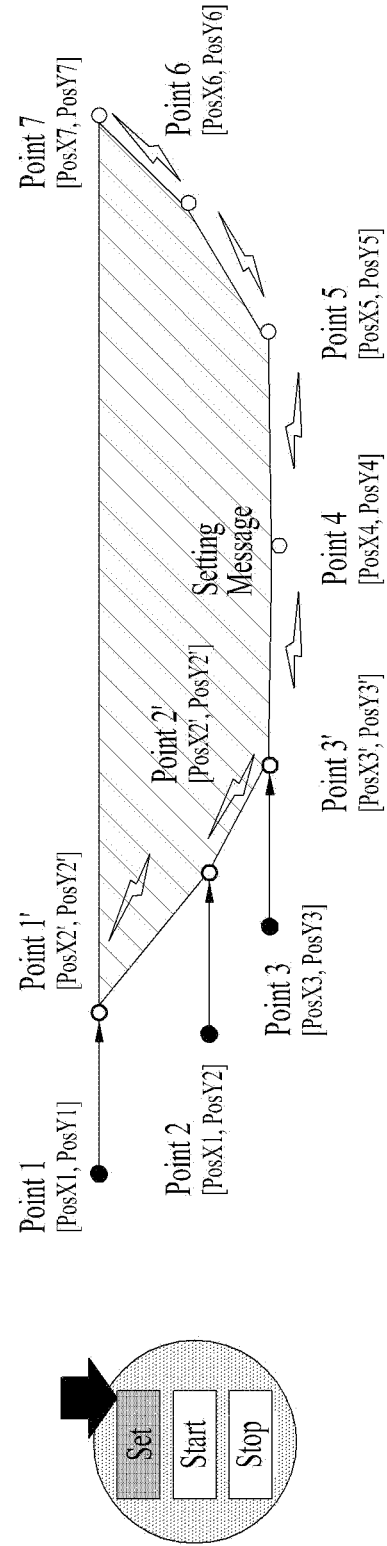

FIG. 15 is a diagram for explaining a method of configuring the location of a road work zone according to embodiment(s) of the present disclosure.

Referring to FIG. 15, as road work progresses, the location of device 1 may change from point 1 to point 1', the location of device 2 may change from point 2 to point 2', and the location of device 3 may change from point 3 to point 3'.

According to the prior art, each device may transmit only initially set road work zone area information. As a result, if the road work zone area is changed, information on changes in the road work zone area may not be transmitted.

However, according to embodiment(s) of the present disclosure, when a road work zone worker changes the location of each device, the road work zone worker may set each device again to transmit information on changes in the road work zone area.

For example, the road work zone worker may press the set button on each device and place each device at a desired location. Alternatively, the road work zone worker may press the set button after changing the location of the device. The above setting method performed by the road work zone worker is merely an example, and the setting may be performed in various ways. In another embodiment, the road work zone worker may press the set button after installing the device at a desired location.

When the set button is pressed on the device whose location is changed, the device may measure its location and transmit new location information to adjacent devices. After the device reinstallation is completed, devices may share new location information for a specific period (timeout) and then transmit a new V2X message for guiding a new road work zone to nearby vehicles.

[Proposed Message Structure—C-V2X]

FIG. 16 is a diagram illustrating a message structure according to embodiment(s) of the present disclosure.

FIG. 16(*a*) shows a message structure in which an I2I message is added by extending a conventional infrastructure message (V2I). That is, the message structure is a structure for adding a setting container and an event container for an I2I message to a conventional road safety message (RSM). FIG. 16(*b*) shows the structure of a new I2I-dedicated message (infrastructure operating message (IOM)).

A message for I2I communication may include a setting container used for configuring infrastructure and an event container used for infrastructure operation. When the I2V message is used, it has advantages of using the conventional message structure as it is. In addition, the I2V message may be simultaneously transmitted during the setting. On the other hand, when the dedicated message (IOM) is used, it has an advantage of independently operating the dedicated message without modifying the conventional message structure. In particular, a service channel other than the I2V communication frequency may be used, and only the setting container and event container for I2I communication may be transmitted without transmitting an I2V mandate field such as a road work zone container FIG. 17 illustrates configurations of a setting container and an event container according to embodiment(s) of the present disclosure.

Referring to FIG. 17(*a*), the setting container is a message container used for configuring infrastructure through I2I communication. The corresponding container may include a setting type, a timeout value, and a data value used for setting. Data used in this embodiment may be composed of a point position and a point position list to accurately represent the area of a road work zone. The setting type is a control signal indicating a setting state and may be defined as an integer (1 to 16) (4 bits). If the setting type is 1, it may mean a ConfigureSet state, if the setting type is 2, it may mean a start state, and if the setting type is 3, it may mean a ConfigureFinish state. The timeout value may mean a value defining the corresponding timeout time. The timeout value has an integer (1 to 65536) (16 bits), and the unit thereof may be seconds (sec). If the timeout value is set to 10, it may mean that the timeout is executed after 10 seconds.

The point position is a field defining the position of the infrastructure and may use a conventional format, DF_ReferencePosition. The point position list may be data obtained by collecting the point positions of nearby devices. The point position list may be represented as a sequence and may have a maximum of 100 values. Data has the same format DE_Position as the point position.

Referring to FIG. 17(*b*), the event container is transmitted when a vehicle rushes or a dangerous situation is detected during operation. The event container may include the following fields: event type, event ID, event code, event time, and event release time. The event type is defined as an integer (1 to 16) (4 bits) and may include data indicating the state of an event. When the event type is 1, it may indicate that the event has occurred. When the event type is 2, it may indicate that the state of the event has been updated. When the event type is 3, it may indicate that the event has been released. The event ID is defined as an integer and may have a random value (1 to 65536). The event ID may identify events. The event code is defined as an integer (1 to 256) (8 bits) and may indicate the type of event. The corresponding values may have the same table as a table predefined by the standard. For example, if a value of 1 is mapped as a crash in the table, an event code value of 1 may mean that the device has detected a crash. These values are related to operations and are not specified in the present disclosure (DE_CauseCodeType [1] may be used). The event time is data indicating the occurrence time of an event and may follow UTC formats based on DE_TimestampIts W. The event time is displayed in units of milliseconds, and the corresponding field is optional. The event release time may be a field indicating the end time of an event independently of reception of a release signal in an event message, and the event release time may be informed by DE_TimestampIts.

[Proposed Message Operation—C-V2X]

FIG. 18 is a diagram for explaining a message protocol for an initial setting.

When device 1 is initially installed and the set button is pressed on device 1 after the installation, device 1 transmits a setting message containing its location to adjacent devices. Thereafter, an adjacent device, device 2 transmits a setting message including the previously received location of device 1 and its own location information to the surroundings. After setting all devices, a road work zone worker presses the start button. When the start button is triggered, each device transmits a setting message and a warning message including road work zone information. In this case, the transmitted setting information is shared by each device to change the mode. If a timeout is triggered after a predetermined period of time, each device transmits a warning message including road work zone danger information to nearby vehicles.

In other words, in a setting mode, a road work zone worker may install each device and press the set button. When the set button is input, device 1 may transmit a setting message including its own location information to adjacent devices. In addition, when the set button is input, device 2 may transmit a setting message including its own location information and the information on the location of device 1 to adjacent devices. Each device may transmit its own location information and a list of received location information on devices to adjacent devices. If the setting is completed, the road work zone worker may press the start button of device 1. Alternatively, the road work zone worker may press the start button of any one of devices 1 to 7. If the start button of device 1 is input, device 1 may transmit a warning message and a setting message together to adjacent devices. Each device may acquire location information on all devices installed in a road work zone area by sharing a list of device locations included in the setting message. The warning message may include the location information on all devices in the road work zone area. When a timeout elapses after pressing the start button, each device may terminate transmission of the setting message and operate in an operating mode to transmit a warning message to vehicles.

Figure 19:
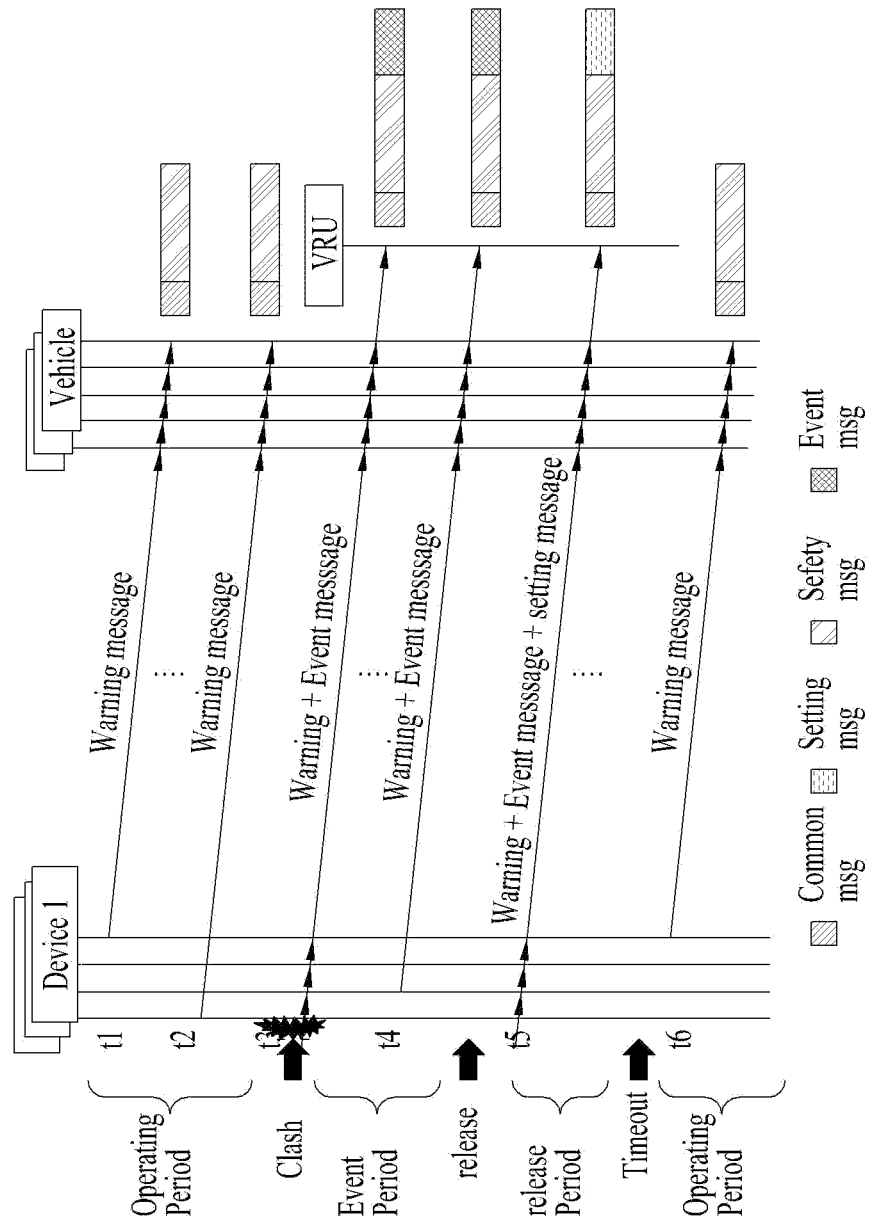

FIG. 19 is a diagram for explaining a message protocol when a special situation occurs while a road work zone danger guide service is provided.

In the operating mode, if device 1, which is a road work guide device, senses an impact, device 1 switches to an event mode. Device 1 transmits a message including event information in addition to the warning information. Upon receiving the corresponding message, devices extract the event information from the message and transmit messages by including the event information together with the warning information. In this way, all devices may transmit the warning information and the event information. The corresponding messages are received by nearby vehicles and VRUs so that the status of the event is informed through a HMI. After the event is released, the road work zone worker presses the start button to end the special situation. Then, each device notifies adjacent device of the end of the special situation so that the devices may return to the operating mode. Thereafter, all devices transmit a message including the warning information again.

Figure 20:
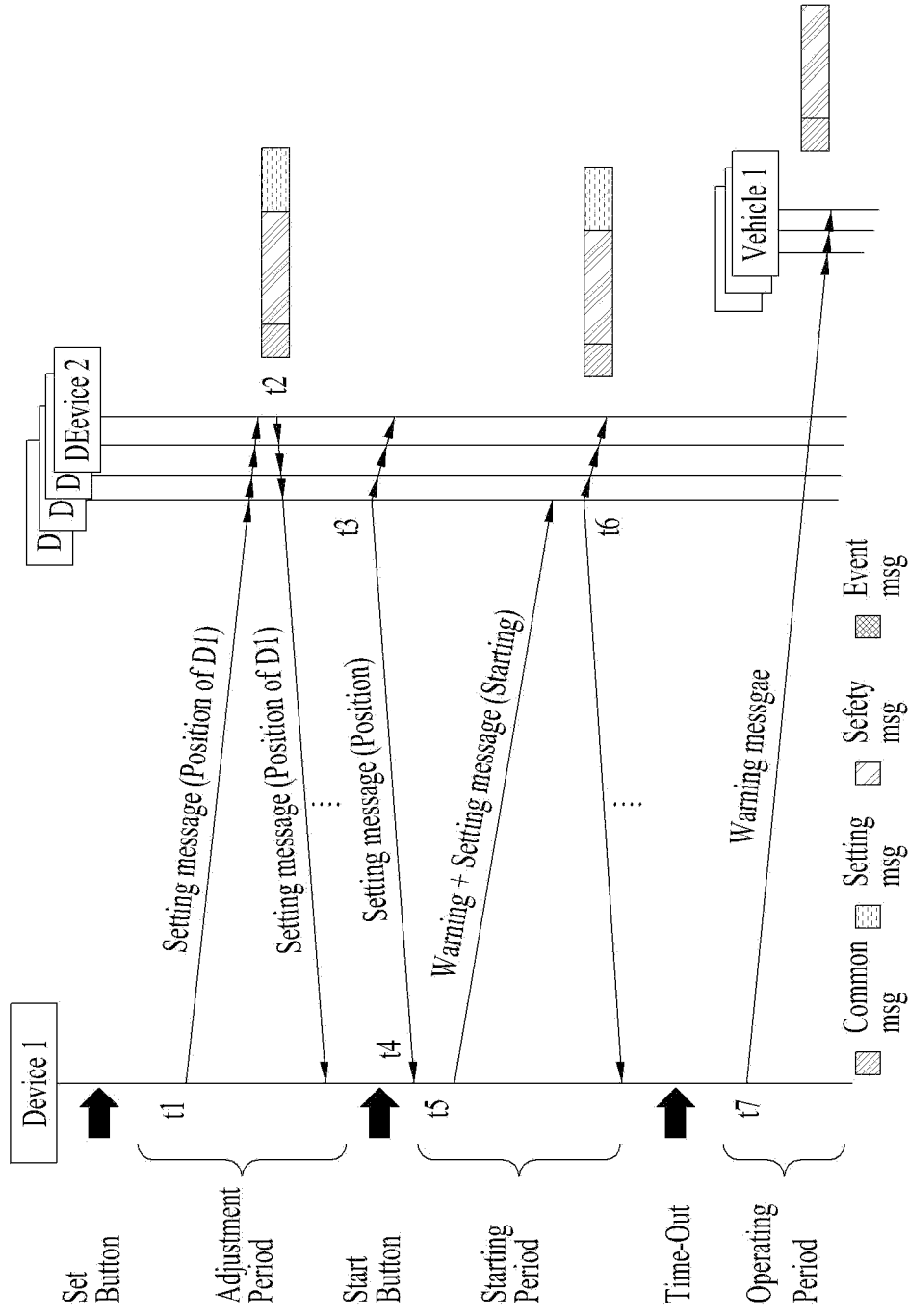

FIG. 20 is a diagram for explaining a message protocol for updating the area of a road work zone when the road work zone area varies. In the operating mode, if the road work zone area varies by changing the location of a road work guide device (device 1), a road work zone worker presses the set button of device 1 to adjust the location. Then, device 1 may inform adjacent devices of its new location information. In this case, a setting message may be used, and the setting message may include the changed location of device 1. Other devices may transmit the location information on device 1 to adjacent devices so that all devices recognize the new road work zone area. When all settings are completed, the road work zone worker may configure the new road work zone area by pressing the start button of one of the devices. Thereafter, synchronization is performed as follows: a timeout starting signal is shared by all devices for a predetermined period of time to allow all devices to switch to the operating mode. After the predetermined period of time, all devices switch to the operating mode and notify the new road work zone area to the surroundings.

[Proposed Message Structure—NR-V2X]

With development of Rel-16, V2X devices are in preparation for NR-V2X (or 5G V2X) technology. In conventional C-V2X, only broadcast communication is used for direct communication, whereas in NR-V2X, unicast communication is newly added and used to efficiently provide each service.

FIG. 21 is a diagram for explaining a message structure for NR-V2X.

Referring to FIG. 21, a message for NR-V2X may include a setting message used for setting and an operating message used for post-installation operation.

FIG. 21(a) shows the structure of the setting message. The setting message consists of a common header for NR-V2X, a setting header containing basic information on the setting message, and a setting information container containing installation information on each device. The setting information container may include information on each device. The device information may be composed of a device ID for identifying devices and position information for indicating the installation location of a device. The corresponding message is used when a road work zone is initially installed and when the location of the road work zone is adjusted during road work.

FIG. 21(b) shows the structure of the operating message. The operating message may include a common header for NR-V2X, an operating header containing basic information on the operation message, and an operating container.

After setting of each device is completed, each device may transmit the location of a road work zone and road work zone information measured in real time to nearby vehicles in the operating message. Depending on information included in the operating message, the operating message may be classified into an advertisement message notifying that road work is underway, a join message transmitted by a vehicle to an RSU to receive a safety service, a safety message including safety information transmitted by an RSU to a vehicle, and an event message notifying an emergency in a road work zone.

FIG. 22 is a diagram for explaining the configuration of an operating header included in the operating message.

The operation header may include information on an operating message type, a service type, a station type, a safety type, and an event container type.

The operating message type may be configured with an integer. It may be indicated that the operating message corresponds to any one of an advertisement mode, an ACK mode, a safety mode, and an event mode. The message type following the operating message type is defined as an integer and may optionally be used according to the definition of the operating message. That is, the type of operating message may be determined according to information indicated by the operating message type. For example, if the operating message type indicates the advertisement mode, the operating message may be determined as the advertisement message and include service type information. If the operating message type indicates the ACK mode, the operating message may be determined as the join message and include station type information. If the operating message type indicates the safety mode, the operating message may be determined as the safety message and include safety type information. If the operating message type indicates the event mode, the operating message may be determined as the event message and include event container information.

FIG. 23 is a diagram for explaining the structure of the operating message.

The advertisement message may be broadcast by an RSU to nearby anonymous vehicles. A conventional BSM-based (header+common data container+road work zone container) message type is defined as Adv. to inform nearby vehicles that NR-V2X services are currently provided.

The join message may be transmitted by a vehicle to inform an RSU that the vehicle subscribes a corresponding service. The joint message may include a join header and vehicle information informing the state of the vehicle. The vehicle information may use a mandate field used in a BSM and include a BSMID.

The safety message may include a safety header containing basic information on the message, a road work zone container including the overall situation of a road work zone, and a target safety container for vehicles.

The event message is a message informing a specific danger situation in a road work zone. The event message may include an event header containing basic information on an event situation and an event container informing the event situation.

To provide the location of a road work zone location in real time as proposed in the present disclosure, a road work zone setting, a road work zone guide operation, and a road work zone reset operation may be performed. To this end, the present disclosure proposes a communication method between RSU devices or between a vehicle and RSU device in which NR-V2X devices communicate with each other based on the above-described message sets. According to the method, the NR-V2X devices may operate more efficiently than C-V2X devices using a timeout in the conventional broadcast communication.

Figure 24:
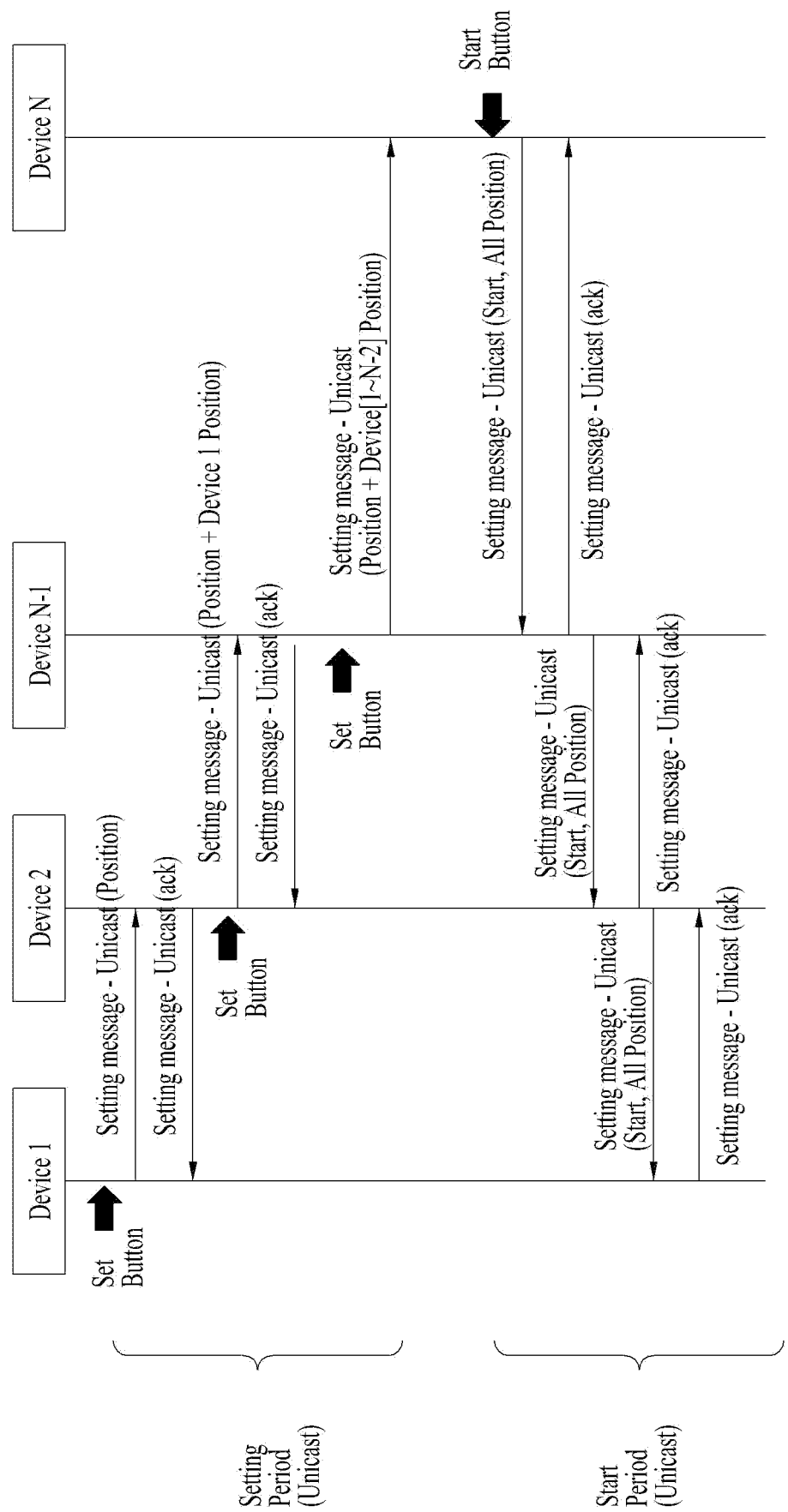

FIG. 24 is a flowchart illustrating transmission of NR-V2X messages during initial installation according to embodiment(s) of the present disclosure.

Referring to FIG. 24, devices 1 to N may operate as RSUs installed in a road work zone area, and each device may perform unicast communication.

A user may sequentially install devices 1 to N. For example, when a user prepares to install devices to guide a road work zone, the user may connect device 1 and device 2, which will be installed later, through unicast communication. In addition, the user may press the set button of device 1 after installing device 1. When the set button is pressed, device 1 may transmit its location information to device 2 through a unicast connection. Then, device 2 automatically transmits an ACK signal to device 1 through an access layer. The user installs device 2 to indicate the area of the road work zone. In this case, device 2 may transmit its installation location to device 3 through unicast communication between device 2 and device 3 as described above. Device 2 may also transmit installation information on device 1 together with its location. The user may install device N−1 and input the set button, and device N−1 may transmit a list of the locations of devices 1 to N−2 together with its location to device N. Accordingly, device N may receive information on the locations of devices 1 to N−1.

When the installation of the last device, device N is completed by sequentially installing the devices in this way, the user may press the start button of device N. When the start button is input, device N may transmit a start message including all the information collected so far to device N−1 through the unicast connection used by the device N to receive. In doing so, all devices share their installation locations. Accordingly, a road work zone safety service may be provided in consideration of the exact location of the road work zone.

Figure 25:
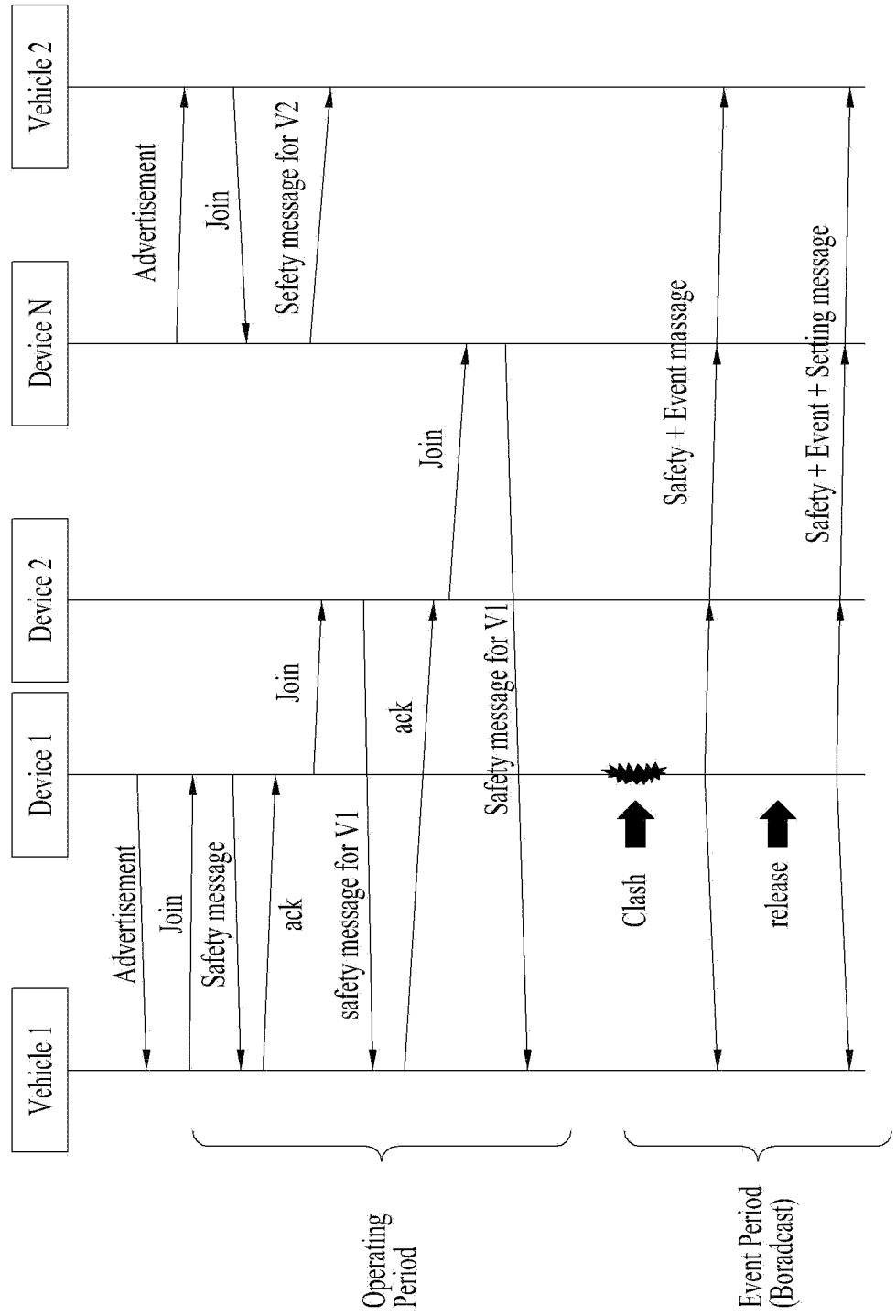

FIG. 25 is a flowchart illustrating transmission of NR-V2X messages during operations according to embodiment(s) of the present disclosure.

When the installation of a road work zone guide device is completed, each device provides a road work zone safety service to nearby vehicles. In conventional C-V2X, a device continuously alerts dangers in a road work zone according to its own cycle regardless of the states of nearby vehicles. In other words, each RSU unilaterally perform broadcast transmission regardless of the presence, type, or state of a vehicle. However, NR-V2X may provide optimized road work zone guidance based on unicast communication.

RSUs installed at the ends of the road work zone area may transmit an advertisement message through broadcast communication in order to notify nearby vehicles that the road work zone exists and there is a dangerous situation on the road. In this case, it is informed that NR-V2X services are provided. Then, a NR-V2X vehicle returns a join message and is provided with a road work zone danger guide service. Thereafter, the vehicle receives a road work zone safety service in a safety message. Device 1 recognizes the state of vehicle 1 and transmits a join message to device 2 after a predetermined period of time to establish a unicast connection. Vehicle 1 receives a safety service from device 2. In this way, a vehicle sequentially receives services from nearby devices until the vehicle completely passes through the road work zone. In addition, a vehicle entering from the opposite side (e.g., vehicle 2) establishes a unicast connection with an RSU at the opposite side (e.g., device N) so that the vehicle receives services optimized for vehicles moving in the opposite direction. The safety message of FIG. 12c may be used as the message, a conventional BSM message may be used for common road work zone information, and vehicle-specific information may be transmitted by a target safety container.

If a vehicle invades or collides with the road work zone, a corresponding device notifies adjacent RSUs and vehicles of the occurrence of an event in an event message. In this case, only the event message may be transmitted, or the safety message and the event message may be transmitted together. To this end, broadcast transmission is used.

Figure 26:
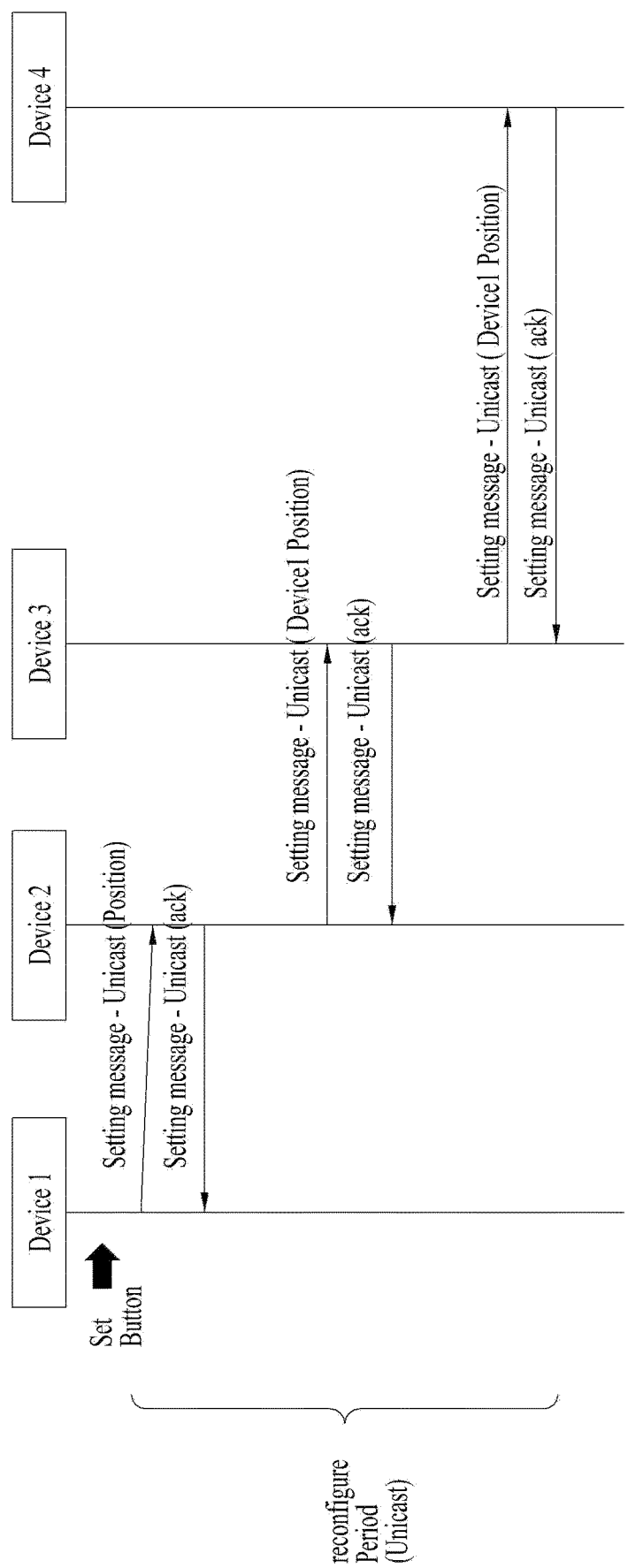

FIG. 26 is a flowchart illustrating transmission of NR-V2X messages during reinstallation according to embodiment(s) of the present disclosure.

For the operation of resetting the road work zone, a setting message may be used as in the initial setting stage. To this end, a user may move one RSU device in operation for resetting and press the set button of the device. When the location of device 1 is changed and the set button thereof is pressed as described above, device 1 may transmit new information based on a unicast connection list configured when device 1 is installed at the new location. The new location may be transmitted from device 1 to device 2, from device 2 to device 3, and from device 3 to device 4.

[Link-Map Operation Method for Unicast Connection]

Unicast between RSUs may enable efficient and fast channel setup. To this end, a connection map between fixed RSUs needs to be established.

Figure 27:
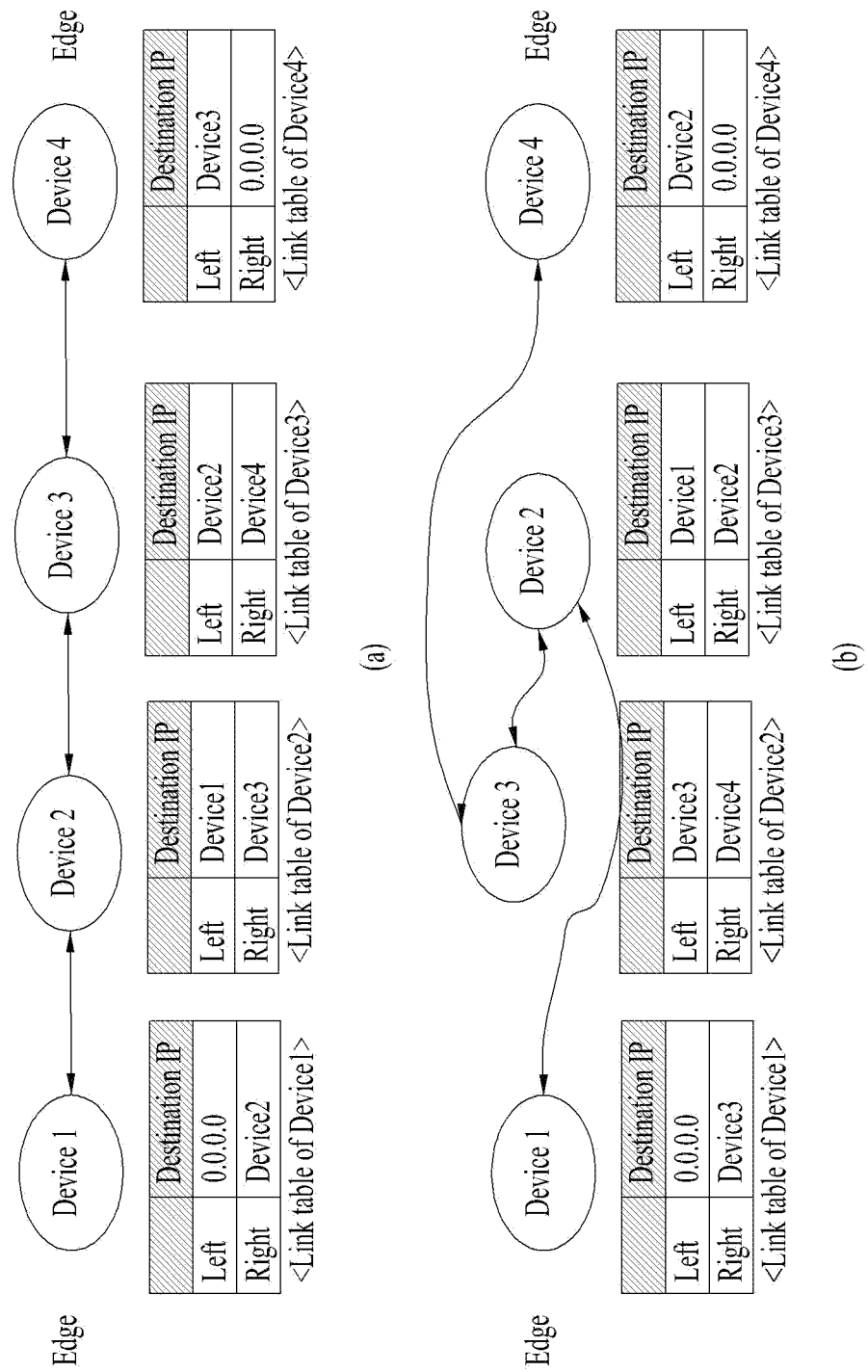

FIG. 27 is a diagram for explaining a method of configuring a connection map between RSUs according to embodiment(s) of the present disclosure.

Referring to FIG. 27(a), each RSU device has a memory to store the destination IPs of devices connected to both ends thereof. Each RSU device is arranged according to the initial installation order. Since there is no device at the left of device 1 located at the beginning, the left is marked as Edge, and the IP of device 2 is stored on the right side. The IP of device 1 is stored on the left side of device 2, and the IP of device 3 is stored on the right side of device 2. In the case of the last device, device 4, the IP of the previous device, device 3 is stored on the left, and 0.0.0.0 is stored in the right field because it is an edge.

FIG. 27(b) is a diagram for explaining a case in which the locations of devices are changed.

There may be cases where the location of a device is changed or the order needs to be changed depending on installation locations. In this case, the link between devices needs to be changed, and the values of all connected connections also needs to be modified. Device 2 and device 3 may change the locations through mutual agreement. Specifically, device 2 changes its left side to device 3 and its right side to device 4, which is connected to device 3. Device 3 also changes its right side to device 2 and the left side to device 1, which is connected to device 2. In addition, device 1 and device 4, which are respectively connected to device 2 and device 3, change their values.

Figure 28:
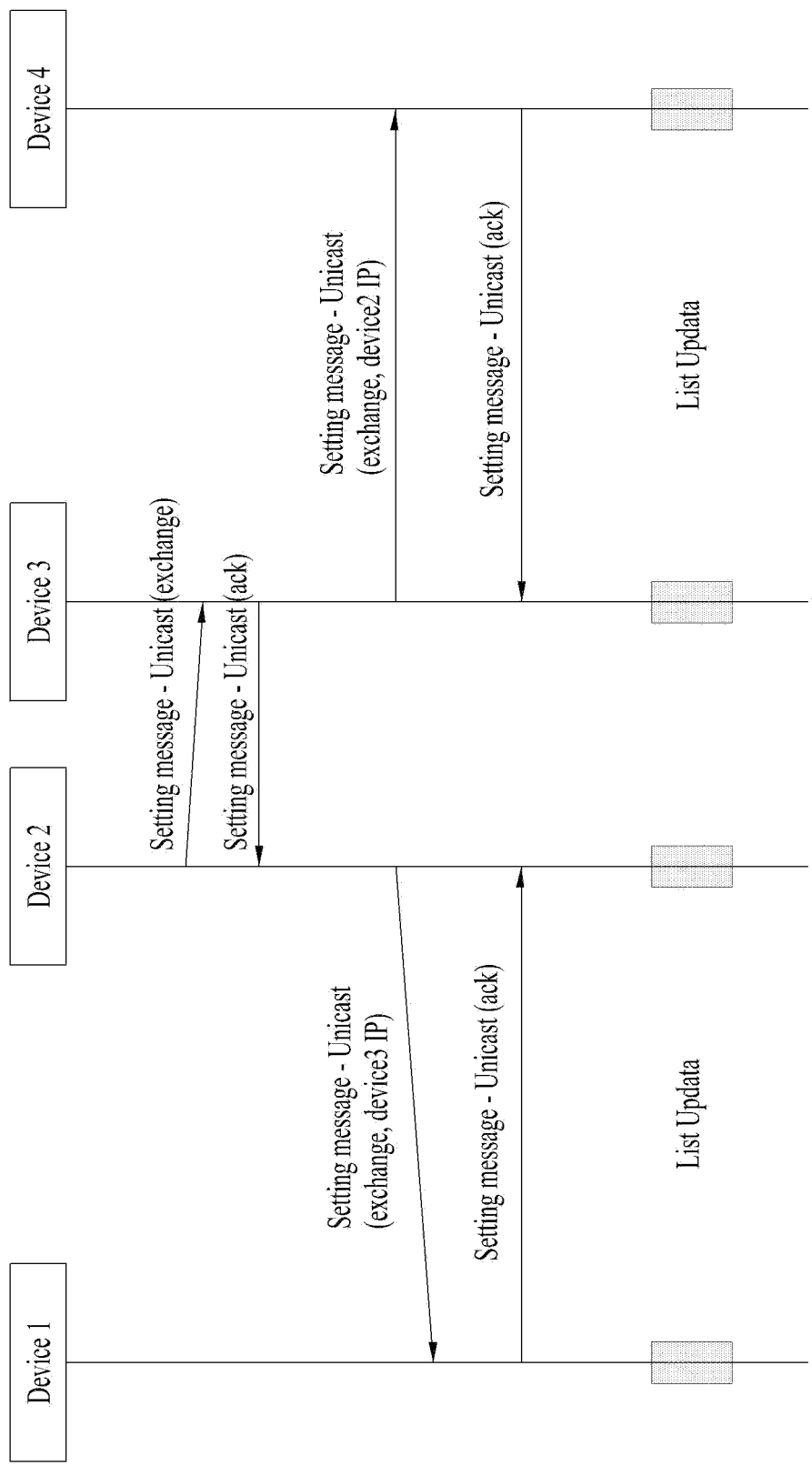

FIG. 28 is a diagram illustrating a method of exchanging messages when the locations of devices are changed.

Referring to FIG. 28, devices change their settings by using setting messages in order to change each connection value. When the locations of device 2 and device 3 are changed for unicast, device 2 and device 3 may exchange messages. First, when device 2 needs to change its location, device 2 may request device 3 to change their locations. Then, device 3 may transmit an ACK signal to respond to the request. Thereafter, each device notifies information on the change to the surroundings. That is, device 2 transmits to device 1 a message indicating that device 1 needs to change the link from device 2 to device 3. Device 3 also transmits to device 4 a signal indicating that device 4 needs to change the link from device 3 to device 2 together with the IP number. Thereafter, all four devices update the connection list.

Figure 29:
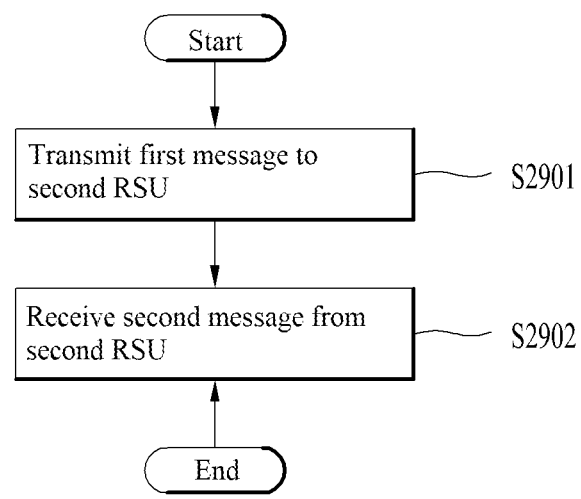

FIG. 29 is a flowchart for explaining embodiment(s) proposed in the present disclosure.

Each of first and second RSUs may be a device, a road work zone guide device, a V2X device, or infrastructure installed within a road work zone area.

The first RSU may transmit a first message to the second RSU through I2I communication (S2901). In addition, the first RSU may receive a second message from the second RSU through the I2I communication (S2902). The first and second messages may be setting messages. Specifically, the first message may include the location of the first RSU and a first location list. The location of the first RSU may reflect the location of the first RSU that is changed in real time. In addition, each device installed in the road work zone area may transmit its own location and a list of locations received from other devices in a setting message. Upon receiving setting messages from other devices, the first RSU may perform an update by reflecting the locations and location lists of the other devices that has received the first location list from the first RSU. Accordingly, even when the location of each device is changed, each device may share the changed location information in real time through the I2I communication.

When a setting button is input to the first RSU, the first RSU may transmit the first message to the second RSU. A user or a road work zone worker may input the setting button when initially installing an RSU in the road work zone area or when changing the location of the RSU.

The setting message may include setting type information. In particular, when a start button is input to the first RSU, the setting type information may indicate a start state.

The first message may include a timeout time. In particular, when the timeout time elapses after the start button is input to the first RSU, the transmission of the first message may be stopped.

When the timeout time elapses after the start button is input to the first RSU, a warning message for the road work zone area may be transmitted to one or more vehicles.

The first and second messages may include event information. If a vehicle invades the road work zone area and collides with an RSU, the RSU may transmit an event message to another RSU. The event information may include information on a dangerous situation occurring in the road work zone area.

The first and second RSUs may perform unicast communication through a unicast connection. Thus, when the first RSU transmits the first message to the second RSU, the second RSU may transmit ACK feedback to the first RSU upon successfully receiving the first message. Accordingly, each RSU may accurately transmit a setting message and an event message through unicast communication.

Although the proposed method has been described as an example of informing road work zone danger information, the method may be applied not only to the corresponding service but also to an I2I communication system and a message structure for operating a service system in which multi-infrastructure is configured among ITS systems. To this end, data related to setting and event containers for an I2I message may be added, thereby applying the method to other services In the present disclosure, a method of increasing the quality of service by adding I2I communication to services provided in conventional V2X communication is proposed. In the prior art, there are difficulties in that people needs to directly set or manage V2X services, whereas when the I2I communication proposed in the present disclosure is applied, devices may autonomously exchange information and provide services, thereby improving user convenience.

Examples of Communication Systems Applicable to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 30:
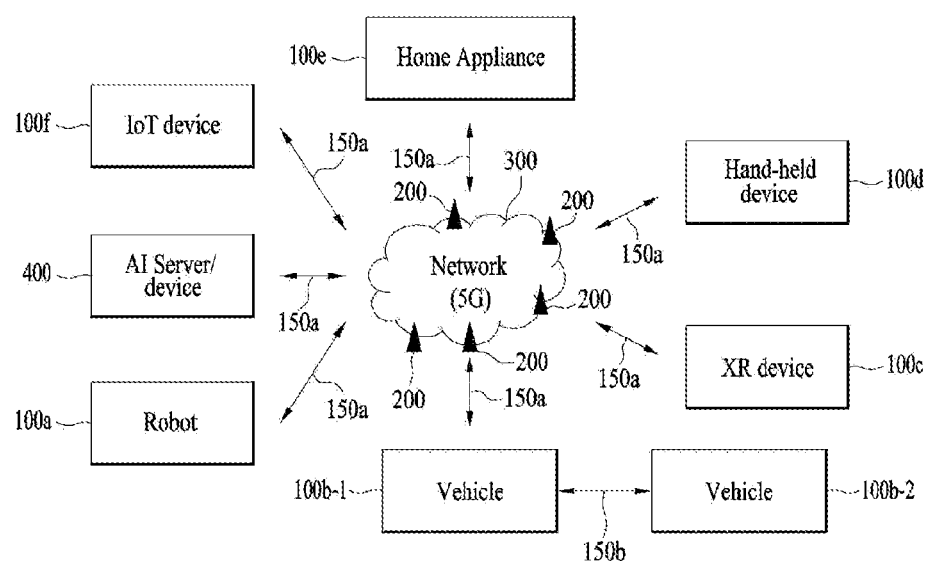
FIGS. 30 to 39 are block diagrams illustrating various devices applicable to embodiment(s) of the present disclosure.

FIG. 30 illustrates a communication system 1 applied to the present disclosure.

Referring to FIG. 30, a communication system 1 applied to the present disclosure includes wireless devices, BSs, and a network. Herein, the wireless devices represent devices performing communication using RAT (e.g., 5G NR or LTE) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. V2V/V2X communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as UL/DL communication 150a, sidelink communication 150b (or, D2D communication), or inter BS communication (e.g. relay, integrated access backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices Applicable to the Present Disclosure

Figure 31:
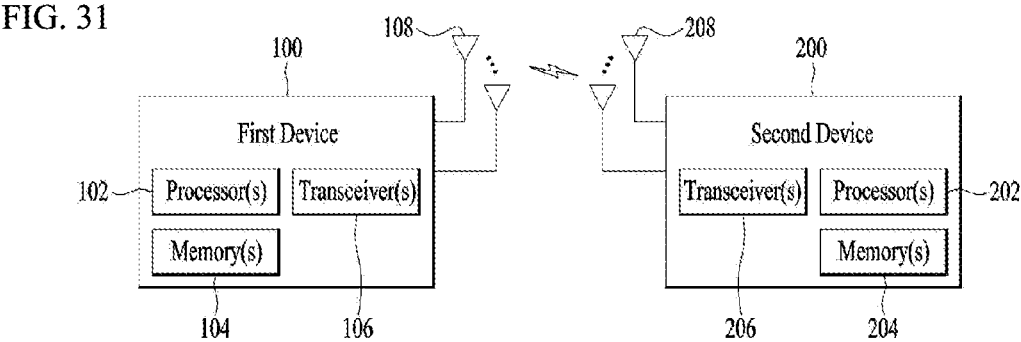

FIG. 31 illustrates wireless devices applicable to the present disclosure.

Referring to FIG. 31, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 30.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Signal Process Circuit Applicable to the Present Disclosure

Figure 32:
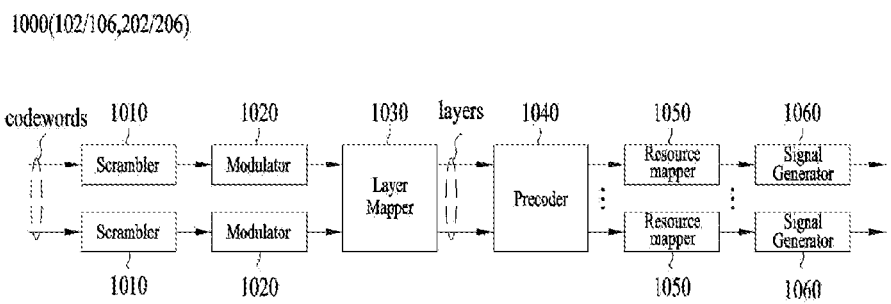

FIG. 32 illustrates a signal process circuit for a transmission signal.

Referring to FIG. 32, a signal processing circuit 1000 may include scramblers 1010, modulators 1020, a layer mapper 1030, a precoder 1040, resource mappers 1050, and signal generators 1060. An operation/function of FIG. 32 may be performed, without being limited to, the processors 102 and 202 and/or the transceivers 106 and 206 of FIG. 31. Hardware elements of FIG. 32 may be implemented by the processors 102 and 202 and/or the transceivers 106 and 206 of FIG. 31. For example, blocks 1010 to 1060 may be implemented by the processors 102 and 202 of FIG. 31. Alternatively, the blocks 1010 to 1050 may be implemented by the processors 102 and 202 of FIG. 31 and the block 1060 may be implemented by the transceivers 106 and 206 of FIG. 31.

Codewords may be converted into radio signals via the signal processing circuit 1000 of FIG. 44. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include IFFT modules, CP inserters, digital-to-analog converters (DACs), and frequency up-converters.

Signal processing procedures for a signal received in the wireless device may be configured in a reverse manner of the signal processing procedures 1010 to 1060 of FIG. 32. For example, the wireless devices (e.g., 100 and 200 of FIG. 31) may receive radio signals from the exterior through the antenna ports/transceivers. The received radio signals may be converted into baseband signals through signal restorers. To this end, the signal restorers may include frequency DL converters, analog-to-digital converters (ADCs), CP remover, and FFT modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Examples of Application of Wireless Device Applicable to the Present Disclosure

Figure 33:
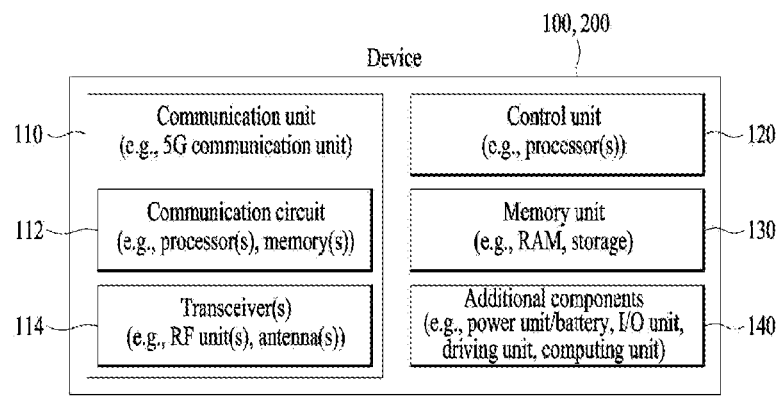

FIG. 33 illustrates another example of a wireless device applied to the present disclosure. The wireless device may be implemented in various forms according to a use-case/service (refer to FIG. 30).

Referring to FIG. 33, wireless devices 100 and 200 may correspond to the wireless devices 100 and 200 of FIG. 43 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 31. For example, the transceiver(s) 114 may include the one or more transceivers 106 and 206 and/or the one or more antennas 108 and 208 of FIG. 31. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 30), the vehicles (100*b*-1 and 100*b*-2 of FIG. 30), the XR device (100*c* of FIG. 30), the hand-held device (100*d* of FIG. 30), the home appliance (100*e* of FIG. 30), the IoT device (100*f* of FIG. 30), a digital broadcast terminal, a hologram device, a public safety device, an MTC device, a medicine device, a FinTech device (or a finance device), a security device, a climate/environment device, the AI server/device (400 of FIG. 30), the BSs (200 of FIG. 30), a network node, etc. The wireless device may be used in a mobile or fixed place according to a use-example/service.

In FIG. 33, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Hereinafter, an example of implementing FIG. 33 will be described in detail with reference to the drawings.

Examples of a Hand-Held Device Applicable to the Present Disclosure

Figure 34:
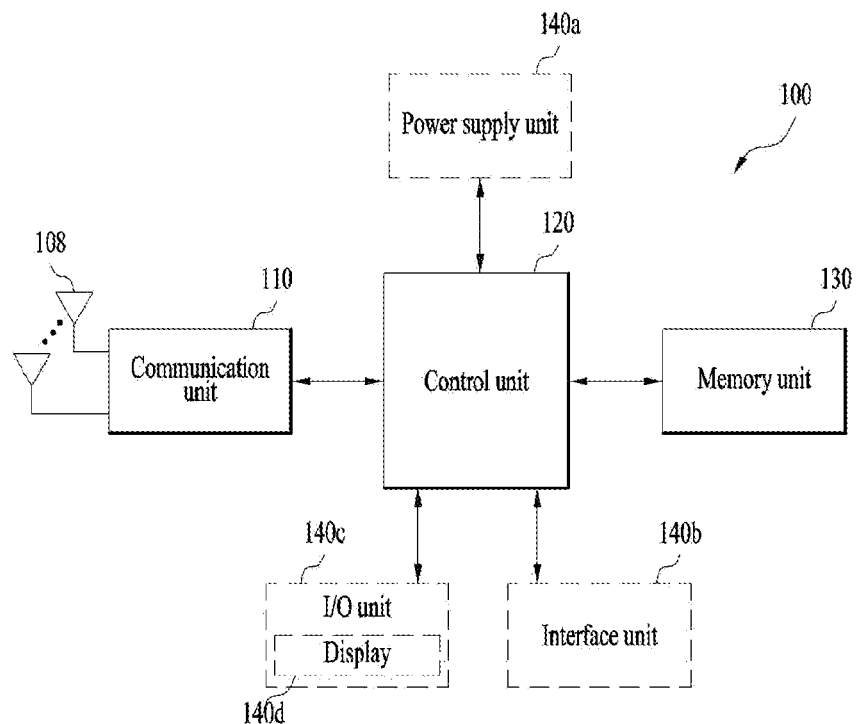

FIG. 34 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 34, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 33, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an application processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 35:
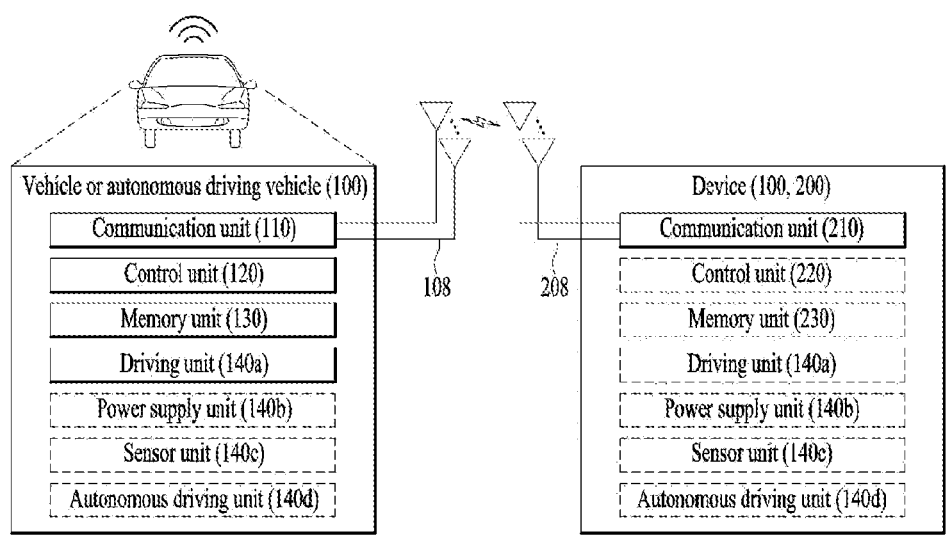

Examples of a Vehicle or an Autonomous Driving Vehicle Applicable to the Present Disclosure FIG. 35 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 35, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 33, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of a Vehicle and AR/VR Applicable to the Present Disclosure

Figure 36:
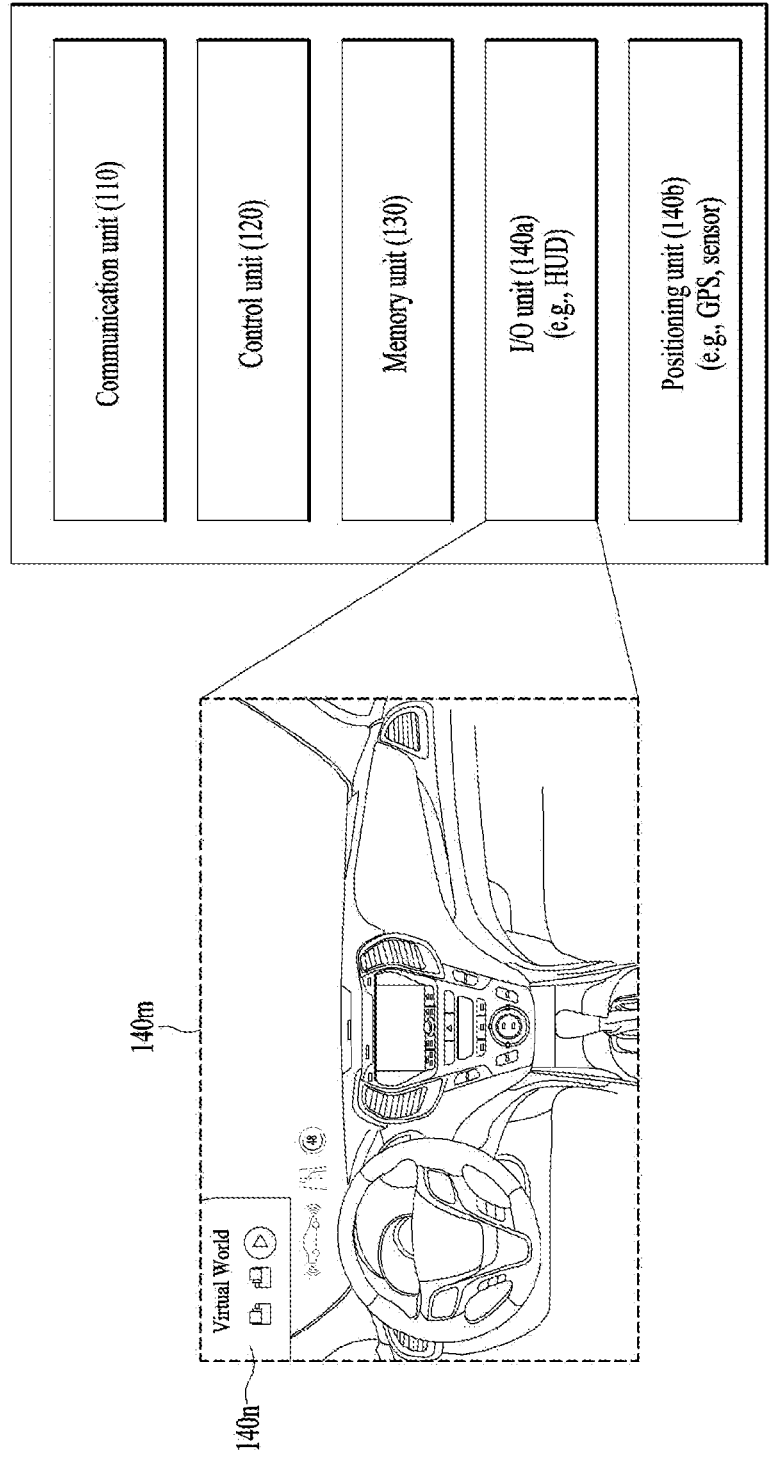

FIG. 36 illustrates a vehicle applied to the present disclosure. The vehicle may be implemented as a transport means, an aerial vehicle, a ship, etc.

Referring to FIG. 36, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 33.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Examples of an XR Device Applicable to the Present Disclosure

Figure 37:
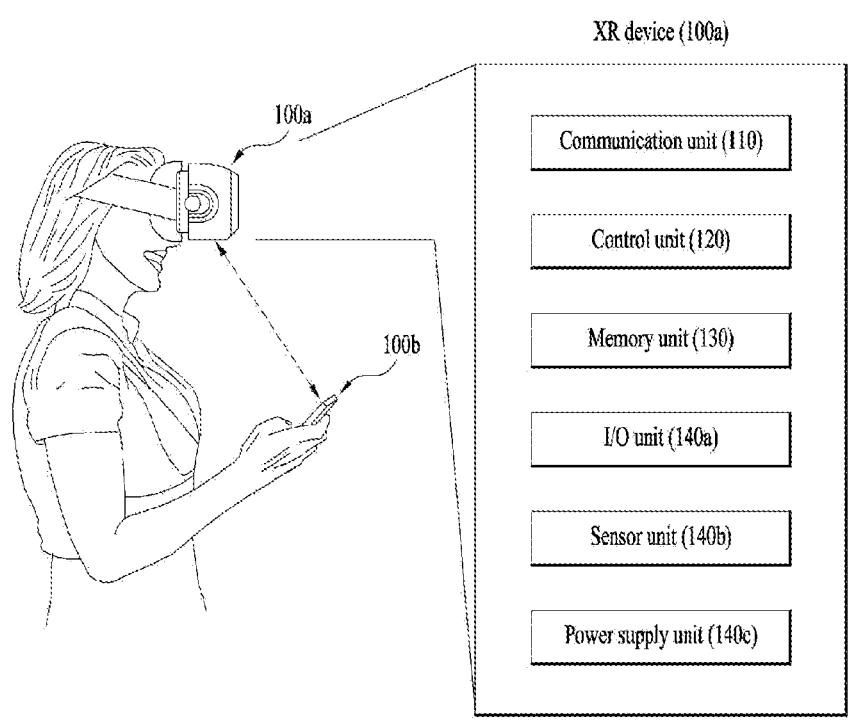

FIG. 37 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 37, an XR device 100a may include a communication unit 110, a control unit 120, a memory unit 130, an I/O unit 140a, a sensor unit 140b, and a power supply unit 140c. Herein, the blocks 110 to 130/140a to 140c correspond to the blocks 110 to 130/140 of FIG. 33, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100a. For example, the control unit 120 may be configured to control and/or perform procedures such as video/image acquisition, (video/image) encoding, and metadata generation and processing. The memory unit 130 may store data/parameters/programs/code/commands needed to drive the XR device 100a/generate XR object. The I/O unit 140a may obtain control information and data from the exterior and output the generated XR object. The I/O unit 140a may include a camera, a microphone, a user input unit, a display unit, a speaker, and/or a haptic module. The sensor unit 140b may obtain an XR device state, surrounding environment information, user information, etc. The sensor unit 140b may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140c may supply power to the XR device 100a and include a wired/wireless charging circuit, a battery, etc.

For example, the memory unit 130 of the XR device 100a may include information (e.g., data) needed to generate the XR object (e.g., an AR/VR/MR object). The I/O unit 140a may receive a command for manipulating the XR device 100a from a user and the control unit 120 may drive the XR device 100a according to a driving command of a user. For example, when a user desires to watch a film or news through the XR device 100a, the control unit 120 transmits content request information to another device (e.g., a hand-held device 100b) or a media server through the communication unit 130. The communication unit 130 may download/stream content such as films or news from another device (e.g., the hand-held device 100b) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140a/sensor unit 140b.

The XR device 100a may be wirelessly connected to the hand-held device 100b through the communication unit 110 and the operation of the XR device 100a may be controlled by the hand-held device 100b. For example, the hand-held device 100b may operate as a controller of the XR device 100a. To this end, the XR device 100a may obtain information about a 3D position of the hand-held device 100b and generate and output an XR object corresponding to the hand-held device 100b.

Examples of a Robot Applicable to the Present Disclosure

Figure 38:
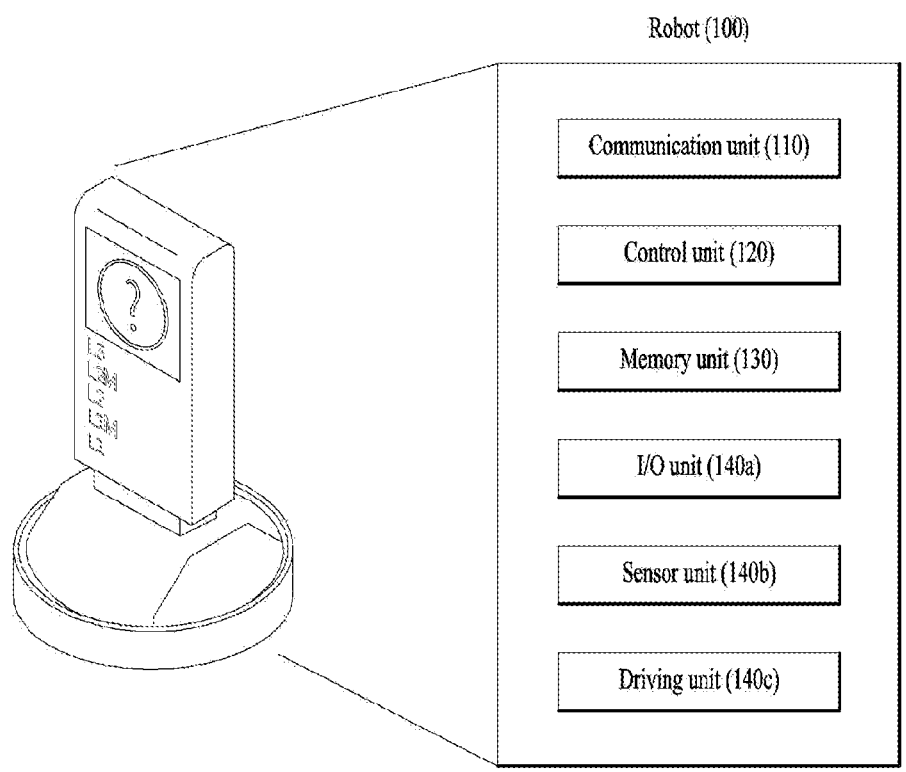

FIG. 38 illustrates a robot applied to the present disclosure. The robot may be categorized into an industrial robot, a medical robot, a household robot, a military robot, etc., according to a used purpose or field.

Referring to FIG. 38, a robot 100 may include a communication unit 110, a control unit 120, a memory unit 130, an I/O unit 140a, a sensor unit 140b, and a driving unit 140c. Herein, the blocks 110 to 130/140a to 140c correspond to the blocks 110 to 130/140 of FIG. 33, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140a may obtain information from the exterior of the robot 100 and output information to the exterior of the robot 100. The I/O unit 140a may include a camera, a microphone, a user input unit, a display unit, a speaker, and/or a haptic module. The sensor unit 140b may obtain internal information of the robot 100, surrounding environment information, user information, etc. The sensor unit 140b may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140c may perform various physical operations such as movement of robot joints. In addition, the driving unit 140c may cause the robot 100 to travel on the road or to fly. The driving unit 140c may include an actuator, a motor, a wheel, a brake, a propeller, etc.

Example of AI Device Applicable to the Present Disclosure

Figure 39:
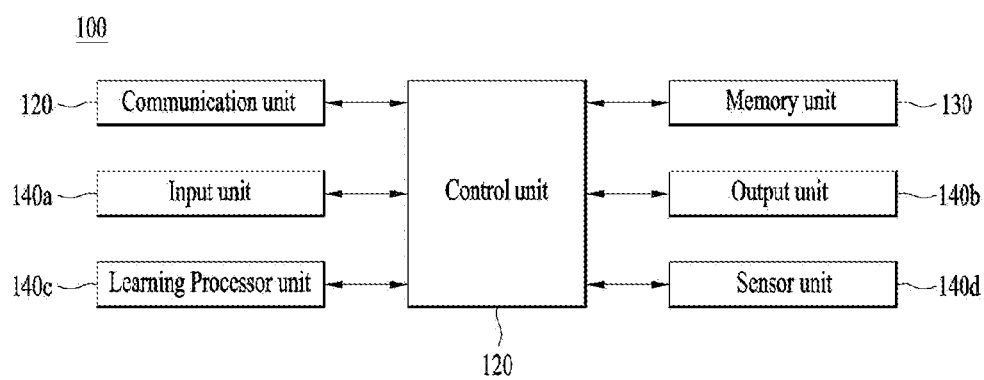

FIG. 39 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 39, an AI device 100 may include a communication unit 110, a control unit 120, a memory unit 130, an I/O unit 140a/140b, a learning processor unit 140c, and a sensor unit 140d. The blocks 110 to 130/140a to 140d correspond to blocks 110 to 130/140 of FIG. 33, respectively.

The communication unit 110 may transmit and receive wired/radio signals (e.g., sensor information, user input, learning models, or control signals) to and from external devices such as other AI devices (e.g., 100x, 200, or 400 of FIG. 30) or an AI server (e.g., 400 of FIG. 30) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 30). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 42). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

INDUSTRIAL APPLICABILITY

The above-described embodiments of the present disclosure are applicable to various mobile communication systems.

The invention claimed is:

1. A method of performing operations by a first road side unit (RSU) in a wireless communication system, the method comprising:
   transmitting a first message including information on a location of the first RSU, a first location list and a timeout time to a second RSU;
   receiving a second message including information on a location of the second RSU and a second location list from the second RSU,
   wherein the first location list is updated based on the information on the location of the second RSU and the second location list,
   wherein, based on a lapse of the timeout time after a start button is input to the first RSU, the transmission of the first message is stopped and a warning message for a road work zone area is transmitted from the first RSU to one or more vehicles.

2. The method of claim 1, wherein each of the first location list and the second location list includes information on locations of one or more RSUs installed in the road work zone area.

3. The method of claim 1, wherein the first message is transmitted to the second RSU based on input of a setting button to the first RSU.

4. The method of claim 1, wherein the first message includes setting type information, and
   wherein the setting type information indicates a start state based on input of the start button to the first RSU.

5. The method of claim 1, wherein based on a change in the location of the first RSU, the first message includes information on the changed location of the first RSU.

6. The method of claim 1, wherein each of the first message and the second message includes event information, and
   wherein the event information includes information on a dangerous situation occurring in the road work zone area.

7. The method of claim 1, wherein the first RSU and the second RSU are connected by unicast.

8. A first road side unit (RSU) in a wireless communication system, the first RSU comprising:
- at least one processor; and
- at least one computer memory operably connected to the at least one processor and configured to store instructions that, when executed, cause the at least one processor to perform operations comprising:
- transmitting a first message including information on a location of the first RSU, a first location list and a timeout time to a second RSU; and
- receiving a second message including information on a location of the second RSU and a second location list from the second RSU,
- wherein the first location list is updated based on the information on the location of the second RSU and the second location list,
- wherein, based on a lapse of the timeout time after a start button is input to the first RSU, the transmission of the first message is stopped and a warning message for a road work zone area is transmitted from the first RSU to one or more vehicles.

9. A non-transitory computer-readable storage medium configured to store at least one computer program including instructions that, when executed by at least one processor, cause the at least one processor to perform operations for a user equipment (UE), the operations comprising:
- transmitting a first message including information on a location of the first RSU, a first location list and a timeout time to a second road side unit (RSU); and
- receiving a second message including information on a location of the second RSU and a second location list from the second RSU,
- wherein the first location list is updated based on the information on the location of the second RSU and the second location list,
- wherein, based on a lapse of the timeout time after a start button is input to the first RSU, the transmission of the first message is stopped and a warning message for a road work zone area is transmitted from the first RSU to one or more vehicles.

10. The first RSU of claim 8, wherein the first RSU is an autonomous driving vehicle or included in an autonomous driving vehicle.

* * * * *